United States Patent
Jatt et al.

(10) Patent No.: US 12,116,009 B2
(45) Date of Patent: Oct. 15, 2024

(54) SYSTEMS AND OPERATIONS OF TRANSFER HUBS FOR AUTONOMOUS TRUCKING SYSTEMS

(71) Applicant: Waymo LLC, Mountain View, CA (US)

(72) Inventors: Charles Jatt, Mountain View, CA (US); Andre Strobel, Mountain View, CA (US); Matt Carroll, Mountain View, CA (US); Shai Ben Nun, Mountain View, CA (US); Brad Luscher, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 115 days.

(21) Appl. No.: 17/689,840

(22) Filed: Mar. 8, 2022

(65) Prior Publication Data
US 2023/0123587 A1 Apr. 20, 2023

Related U.S. Application Data

(60) Provisional application No. 63/200,682, filed on Mar. 22, 2021.

(51) Int. Cl.
*B60W 60/00* (2020.01)
*B60S 5/02* (2006.01)
*B60W 30/02* (2012.01)
*B60W 30/06* (2006.01)
*B67D 7/04* (2010.01)

(52) U.S. Cl.
CPC .............. *B60W 60/001* (2020.02); *B60S 5/02* (2013.01); *B60W 30/02* (2013.01); *B60W 30/06* (2013.01); *B67D 7/0401* (2013.01); *B60W 2300/12* (2013.01); *B60W 2420/403* (2013.01); *B60W 2530/10* (2013.01); *B67D 2007/043* (2013.01)

(58) Field of Classification Search
CPC .... B60W 60/001; B60W 30/02; B60W 30/06; B60W 2300/12; B60W 2420/403; B60W 2530/10; B60W 40/13; B60W 40/02; B60W 60/0023; B60W 2300/14; B60W 2420/408; B60S 5/02; B67D 7/0401; B67D 2007/043; G01M 1/122; G01G 19/12

See application file for complete search history.

(56) References Cited

U.S. PATENT DOCUMENTS 6,431,226 B1 * 8/2002 Koslowsky .......... B67D 7/0401
901/41
8,393,362 B1 * 3/2013 Hollerback .............. B25J 11/00
414/730

(Continued)

FOREIGN PATENT DOCUMENTS

DE 102020007456 A1 * 2/2021

*Primary Examiner* — Rami Khatib
(74) *Attorney, Agent, or Firm* — Lowenstein Sandler LLP

(57) ABSTRACT

Aspects and implementations of the present disclosure relate, generally, to optimization of the autonomous vehicle technology and, more specifically, to a transfer hub for autonomous trucking operations. The transfer hub supports automated trailer delivery, trailer-tractor matching, trailer-tractor hitching, automated post-hitching visual inspection, automated refueling, parking spot calibration, load verification, load distribution assessment, automated brake inspection, and other improvements to the existing technology.

18 Claims, 12 Drawing Sheets

(56) References Cited

U.S. PATENT DOCUMENTS

| | | | | |
|---|---|---|---|---|
| 9,311,761 | B1* | 4/2016 | Ye | B60W 40/00 |
| 2003/0155164 | A1* | 8/2003 | Mantini | B60G 17/005 |
| | | | | 180/209 |
| 2014/0018999 | A1* | 1/2014 | Adams | B60W 40/06 |
| | | | | 701/31.4 |
| 2018/0094966 | A1* | 4/2018 | Buether | B62D 53/068 |
| 2018/0148046 | A1* | 5/2018 | Macnamara | B60G 17/052 |
| 2019/0056736 | A1* | 2/2019 | Wood | B62D 13/00 |
| 2019/0210418 | A1* | 7/2019 | Hall | B60W 30/00 |
| 2020/0283279 | A1* | 9/2020 | Chow | B66F 9/22 |
| 2020/0361492 | A1* | 11/2020 | Stein | B60W 40/13 |
| 2021/0048333 | A1* | 2/2021 | Zhang | B60T 7/22 |
| 2021/0053407 | A1* | 2/2021 | Smith | B60D 1/64 |
| 2021/0174687 | A1* | 6/2021 | Sasmal | G05D 1/0293 |
| 2021/0409925 | A1* | 12/2021 | Suda | H04W 4/80 |
| 2022/0135041 | A1* | 5/2022 | Heseding | B60R 16/0231 |
| | | | | 701/22 |
| 2022/0324525 | A1* | 10/2022 | Vikström | B62D 53/0864 |
| 2022/0371199 | A1* | 11/2022 | Schultz | B62D 53/00 |
| 2023/0418289 | A1* | 12/2023 | Smith | E05C 17/02 |

* cited by examiner

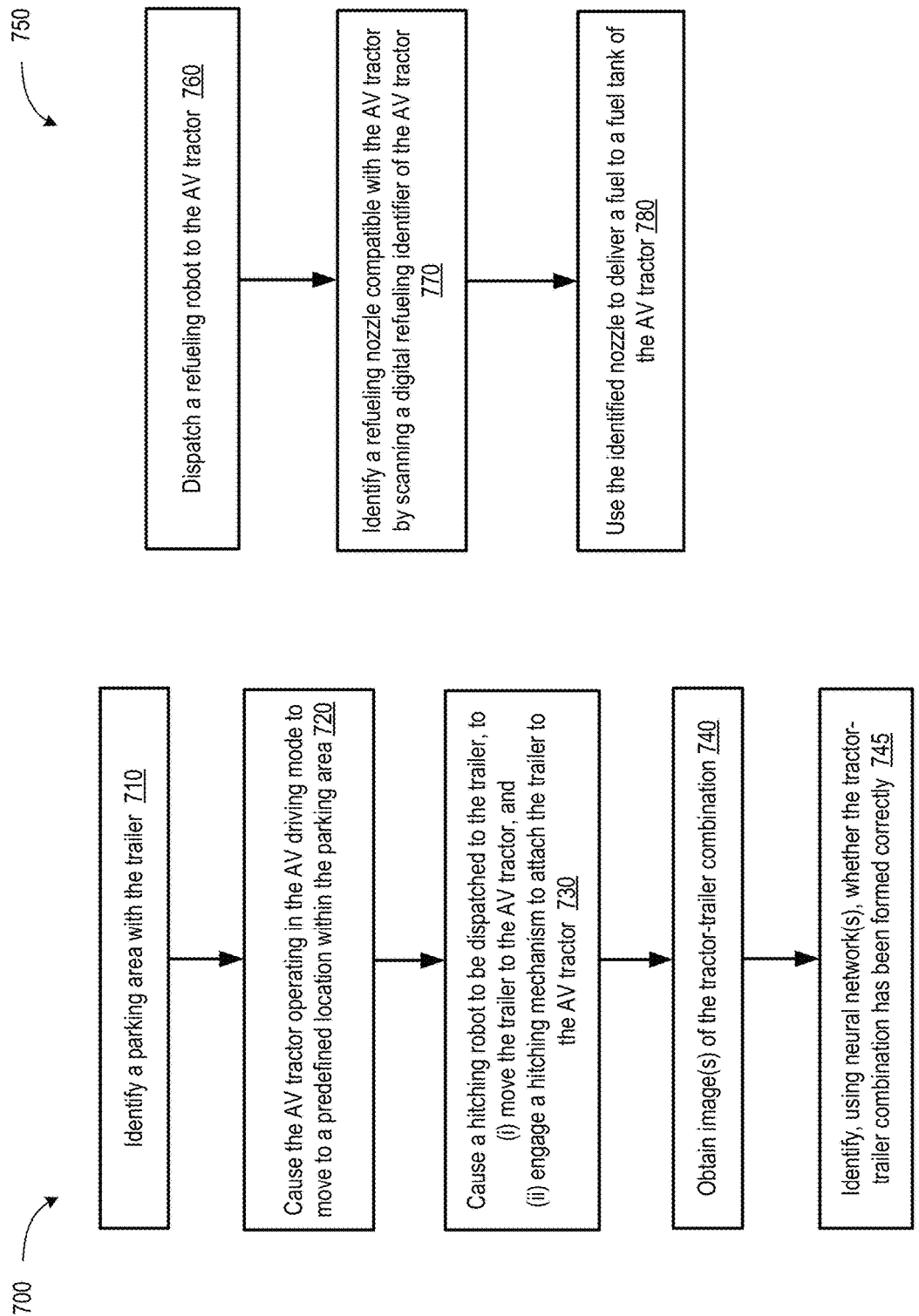

SYSTEMS AND OPERATIONS OF TRANSFER HUBS FOR AUTONOMOUS TRUCKING SYSTEMS

RELATED APPLICATIONS

This application claims the benefit of U.S. Provisional Application No. 63/200,682, filed Mar. 22, 2021, the entire contents of which is being incorporated herein by reference.

TECHNICAL FIELD

The instant specification generally relates to autonomous vehicles. More specifically, the instant specification relates to optimization of autonomous trucking missions by enabling systems and operations of transfer hubs to facilitate local load fetching from an origination depot/distribution center, load-to-trailer hitching, post-hitching load and vehicle assessment, freeway load delivery, load reception, local load delivery to a destination depot/distribution center, post-trip tractor inspection and preparation for the next mission, and other operations related to load delivery by autonomous or partially autonomous vehicles.

BACKGROUND

An autonomous (fully or partially autonomously driven) vehicle (AV) operates by sensing an outside environment with various sensors and charting a driving path through the environment based on Global Navigation Satellite System (GNSS) data and road map data. The autonomous vehicles include trucks that are used for long-distance load deliveries. Trucking industry is sensitive to various operational costs and fuel costs, in particular. Autonomous trucks have to meet high standards of safety, which can include both the standards common for all vehicles (driver-operated and autonomously driven alike) as well as additional standards specific for autonomous trucks. Various solutions that improve fuel efficiency, performance, and safety have to be designed without reliance on visual perception, driving experience, and decision-making abilities of a human operator.

BRIEF DESCRIPTION OF THE DRAWINGS

The present disclosure is illustrated by way of examples, and not by way of limitation, and can be more fully understood with references to the following detailed description when considered in connection with the figures, in which:

FIG. 7A depicts a flow diagram of an example method of automated hitching of a trailer to an autonomously driven truck, in accordance with some implementations of the present disclosure.

FIG. 7B depicts a flow diagram of an example method of automated refueling of an ADT, in accordance with some implementations of the present disclosure.

SUMMARY

Figure 1A:
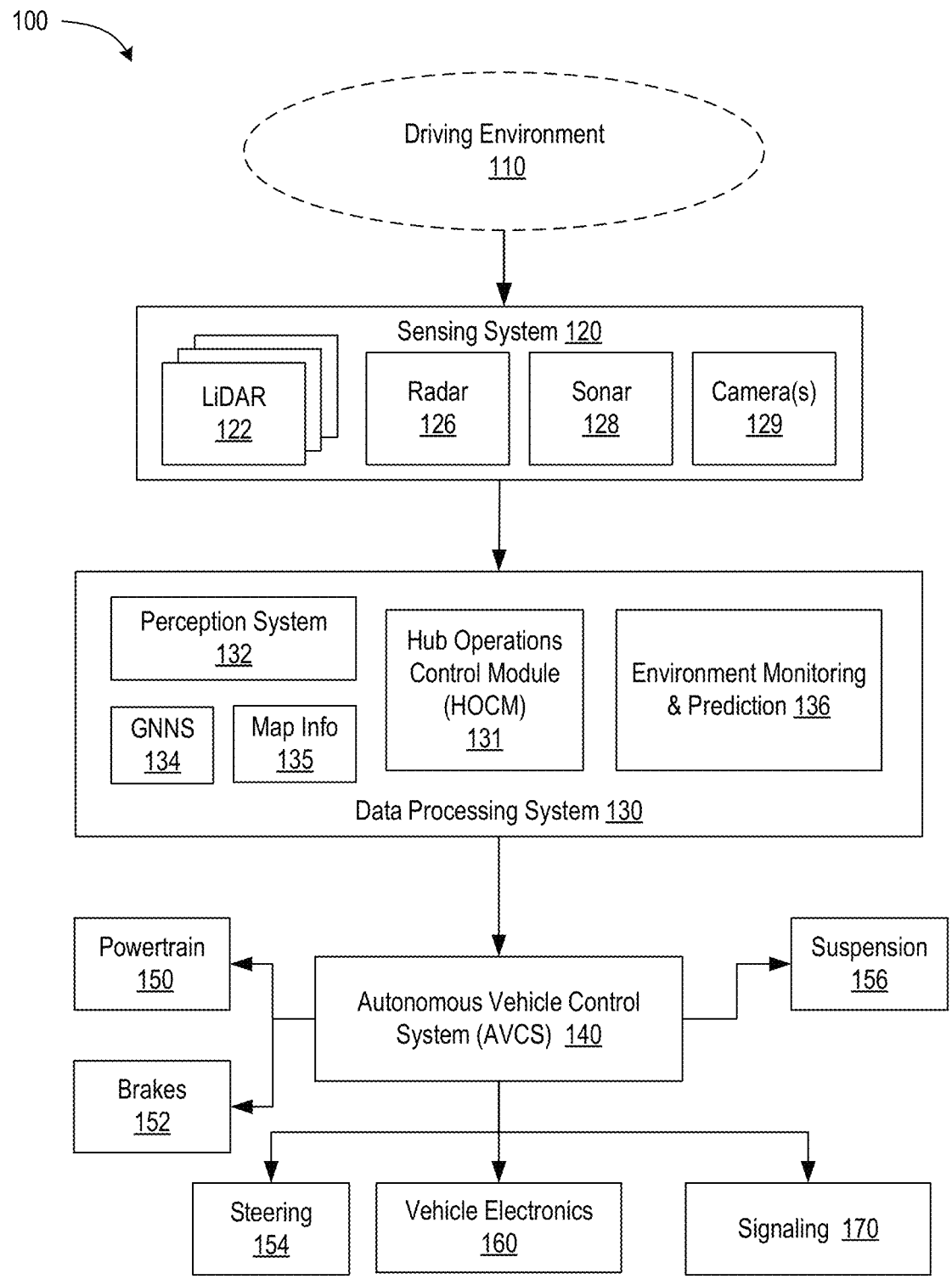
FIG. 1A is a diagram illustrating components of an example autonomous vehicle, such as a autonomously driven truck, that uses sensing and perception technology to determine a driving trajectory, in accordance with some implementations of the present disclosure.

In one implementation, disclosed is a method to commence an autonomous vehicle (AV) driving mission, the method including: causing, by one or more processing devices, a trailer to be attached to an AV tractor to form a tractor-trailer combination, the trailer comprising a load; causing, by the one or more processing devices, the tractor-trailer combination operating in an AV driving mode, to move to a position on a weighing platform; responsive to the tractor-trailer combination being positioned on the weighing platform, obtaining, by the one or more processing devices, a plurality of weight measurements, wherein each of the plurality of weight measurements is associated with a respective wheel of a plurality of wheels of the tractor-trailer combination; and determining, by the one or more processing devices and based at least in part on the plurality of weight measurements, a weight distribution of the load inside the trailer.

In another implementation, disclosed is a system that includes a memory; and one or more processing devices coupled to the memory. The one or more processing devices are to: cause a trailer to be attached to an autonomous (AV) tractor to form a tractor-trailer combination, the trailer comprising a load; cause the tractor-trailer combination operating in an AV driving mode, to move to a position on a weighing platform; responsive to the tractor-trailer combination being positioned on the weighing platform, obtain a plurality of weight measurements, wherein each of the plurality of weight measurements is associated with a respective wheel of a plurality of wheels of the tractor-trailer combination; and determine, based at least in part on the plurality of weight measurements, a weight distribution of the load inside the trailer In another implementation, disclosed is a non-transitory computer-readable medium non-transitory computer-readable medium storing instructions thereon that when executed by one or more processing devices cause the one or more processing devices to: cause a trailer to be attached to an autonomous (AV) tractor to form a tractor-trailer combination, the trailer comprising a load; cause the tractor-trailer combination operating in an AV driving mode, to move to a position on a weighing platform; responsive to the tractor-trailer combination being positioned on the weighing platform, obtain a plurality of weight measurements, wherein each of the plurality of weight measurements is associated with a respective wheel of a plurality of wheels of the tractor-trailer combination; and determine, based at least in part on the plurality of weight measurements, a weight distribution of the load inside the trailer.

DETAILED DESCRIPTION

Autonomous trucking missions involve multiple technological aspects that go beyond roadway driving and include identifying a starting point and a destination for a driving mission, selecting, maintaining, and preparing an autonomously driven truck (ADT) for the driving mission, e.g., refueling and inspecting the ADT, identifying a trailer with a correct load to match the ADT, appropriately hitching the ADT to the trailer, connecting communication and supply lines between the ADT and the trailer, verifying the correctness of the hitching, ensuring that the load is properly balanced and that the vehicle has appropriate suspension settings, and performing a score of additional operations. Upon completion of the driving mission, the load needs to be unhitched at a designated location and the ADT has to be checked and serviced prior to the next driving mission. A large fleet of ADTs may require multiple tasks to be performed for a substantial number of vehicles prior to and after a driving mission. Such operations can become a significant efficiency bottleneck of trucking operations. Presently, such operations are performed by human personnel and are subject to human errors, operator-to-operator variations, and overall come at a price of a significant cost and time.

Aspects and implementations of the present disclosure address these and other shortcomings of the existing technologies by enabling automated transfer hub techniques and operations for autonomous trucking operations. The transfer hub operations include automated trailer delivery, trailer-tractor matching, trailer-tractor hitching, automated post-hitching visual inspection, automated refueling, parking spot calibration, load verification, load distribution assessment, automated brake inspection, and other improvements to the existing technology. The advantages of the disclosed implementations include, but are not limited to, improved efficiency and safety of trucking missions by speeding up pre- and post-mission handling of ADTs and trailers, harmonizing consistency of vehicle preparation, and elimination of human-operator related errors.

FIG. 1A is a diagram illustrating components of an example autonomous vehicle, such as a autonomously driven truck 100, that uses sensing and perception technology to determine a driving trajectory, in accordance with some implementations of the present disclosure. Although subsequent references are made to autonomously driven trucks (ADT), aspects and implementations of the present disclosure should be understood to apply to other autonomous motorized vehicles, such as cars, buses, motorcycles, all-terrain vehicles, recreational vehicles, any specialized farming or construction vehicles, sidewalk delivery robotic vehicles, and the like, or any other vehicles capable of being operated in a autonomously driven mode (without a human input or with a reduced human input).

For brevity and conciseness, various systems and methods are described below in conjunction with autonomously driven trucks, but similar techniques can be used in trucking operations that deploy various driver assistance systems that do not rise to the level of fully autonomous driving systems. More specifically, disclosed techniques can be used in trucks that deploy Society of Automotive Engineers (SAE) Level 2 driver assistance systems implementing steering, braking, acceleration, lane centering, adaptive cruise control, etc., as well as other driver support. The disclosed techniques can be used in trucks that deploy SAE Level 3 driving assistance systems capable of autonomous driving under limited (e.g., highway) conditions. Likewise, the disclosed techniques can be used in trucks that deploy SAE Level 4 self-driving systems that operate autonomously under most regular driving situations and require only occasional attention of the human operator. In all such systems, some or all hub operations of pre- and post-mission handling of trucks and trailer loads may be performed as described techniques herein.

A driving environment 110 can include any objects (animated or non-animated) located outside the ADT, such as roadways, buildings, trees, bushes, sidewalks, bridges, mountains, other vehicles, pedestrians, and so on. The driving environment 110 can be urban, suburban, rural, highway and so on. In some implementations, the driving environment 110 can be an off-road environment (e.g. farming or agricultural land). In some implementations, the driving environment can be an indoor environment, e.g., the environment of an industrial plant, a shipping warehouse, a hazardous area of a building, and so on. In some implementations, the driving environment 110 can be substantially flat, with various objects moving parallel to a surface (e.g., parallel to the surface of Earth). In other implementations, the driving environment can be three-dimensional and can include objects that are capable of moving along all three directions (e.g., balloons, leaves, etc.). Hereinafter, the term "driving environment" should be understood to include all environments in which an autonomous motion of self-propelled vehicles can occur. The objects of the driving environment 110 can be located at any distance from the autonomous vehicle, from close distances of several feet (or less) to several miles (or more).

The example ADT 100 can include a sensing system 120. The sensing system 120 can include various electromagnetic (e.g., optical) and non-electromagnetic (e.g., acoustic) sensing subsystems and/or devices that can be used in object sensing to facilitate autonomous driving, e.g., distance sensing, velocity sensing, acceleration sensing, rotational motion sensing, and so on.

The sensing system 120 can include a radar unit 126, which can be any system that utilizes radio or microwave frequency signals to sense objects within driving environment 110 of ADT 100. The radar unit 126 can be configured to sense both the spatial locations of the objects (including their spatial dimensions) and their velocities (e.g., using the Doppler shift technology).

The sensing system 120 can include one or more lidar sensors 122 (e.g., lidar rangefinders), which can be a laser-based unit capable of determining distances to the objects in driving environment 110, e.g., using time-of-flight (ToF) technology. The lidar sensor(s) 122 can utilize wavelengths of electromagnetic waves that are shorter than the wavelengths of the radio waves and can, therefore, provide a higher spatial resolution and sensitivity compared with the radar unit 126. The lidar sensor(s) 122 can include a coherent lidar sensor, such as a frequency-modulated continuous-wave (FMCW) lidar sensor. The lidar sensor(s) 122 can use optical heterodyne detection for velocity determination. In some implementations, the functionality of a ToF and coherent lidar sensor(s) is combined into a single (e.g., hybrid) unit capable of determining both the distance to and the radial velocity of the reflecting object. Such a hybrid unit can be configured to operate in an incoherent sensing mode (ToF mode) and/or a coherent sensing mode (e.g., a mode that uses heterodyne detection) or both modes at the same time. In some implementations, multiple lidar sensor(s) 122 can be mounted on ADT, e.g., at different locations separated in space, to provide additional information about transverse components of the velocity of the reflecting object.

Lidar sensor(s) 122 can include one or more laser sources producing and emitting signals and one or more detectors of the signals reflected back from the objects. lidar sensor(s) 122 can include spectral filters to filter out spurious electromagnetic waves having wavelengths (frequencies) that are different from the wavelengths (frequencies) of the emitted signals. In some implementations, lidar sensor(s) 122 can include directional filters (e.g., apertures, diffraction gratings, and so on) to filter out electromagnetic waves that can arrive at the detectors along directions different from the directions of the emitted signals. lidar sensor(s) 122 can use various other optical components (lenses, mirrors, gratings, optical films, interferometers, spectrometers, local oscillators, and the like) to enhance sensing capabilities of the sensors.

In some implementations, lidar sensor(s) 122 can scan a full 360-degree view within a horizontal plane. In some implementations, lidar sensor 122 can be capable of spatial scanning along both the horizontal and vertical directions. In some implementations, the field of view can be up to 90 degrees in the vertical direction (e.g., with at least a part of the region above the horizon being scanned by the lidar signals). In some implementations, the field of view can be a full hemisphere. For brevity and conciseness, when a reference to "lidar technology," "lidar sensing," "lidar data," and "lidar," in general, is made in the present disclosure, such a reference shall be understood also to encompass other sensing technology that operate at generally in the near-infrared wavelength, but may include sensing technology that operate at other wavelengths.

The sensing system 120 can further include one or more cameras 129 to capture images of the driving environment 110. The images can be two-dimensional projections of the driving environment 110 (or parts of the driving environment 110) onto a projecting plane (flat or non-flat, e.g. fisheye) of the cameras. Some of the cameras 129 of the sensing system 120 can be video cameras configured to capture a continuous (or quasi-continuous) stream of images of the driving environment 110. The sensing system 120 can also include one or more sonars 128, which can be ultrasonic sonars, in some implementations.

The sensing data obtained by the sensing system 120 can be processed by a data processing system 130 of ADT 100. For example, the data processing system 130 can include a perception system 132. The perception system 132 can be configured to detect and track objects in the driving environment 110 and to recognize the detected objects. For example, the perception system 132 can analyze images captured by the cameras 129 and can be capable of detecting traffic light signals, road signs, roadway layouts (e.g., boundaries of traffic lanes, topologies of intersections, designations of parking places, and so on), presence of obstacles, and the like. The perception system 132 can further receive the lidar sensing data (coherent Doppler data and incoherent ToF data) to determine distances to various objects in the environment 110 and velocities (radial and, in some implementations, transverse) of such objects. In some implementations, the perception system 132 can use the lidar data in combination with the data captured by the camera(s) 129. In one example, the camera(s) 129 can detect an image of a rock partially obstructing a traffic lane. Using the data from the camera(s) 129, the perception system 132 can be capable of determining the angular size of the rock, but not the linear size of the rock. Using the lidar data, the perception system 132 can determine the distance from the rock to the ADT and, therefore, by combining the distance information with the angular size of the rock, the perception system 132 can determine the linear dimensions of the rock as well.

In another implementation, using the lidar data, the perception system 132 can determine how far a detected object is from the ADT and can further determine the component of the object's velocity along the direction of the ADT's motion. Furthermore, using a series of quick images obtained by the camera, the perception system 132 can also determine the lateral velocity of the detected object in a direction perpendicular to the direction of the ADT's motion. In some implementations, the lateral velocity can be determined from the lidar data alone, for example, by recognizing an edge of the object (using horizontal scanning) and further determining how quickly the edge of the object is moving in the lateral direction. Each of the sensor frames can include multiple points. Each point can correspond to a reflecting surface from which a signal emitted by the sensing system 120 (e.g., by lidar sensor(s) 122, etc.) is reflected. The type and/or nature of the reflecting surface can be unknown. Each point can be associated with various data, such as a timestamp of the frame, coordinates of the reflecting surface, radial velocity of the reflecting surface, intensity of the reflected signal, and so on. The coordinates can be spherical (or cylindrical) coordinates, in one implementation. For example, the coordinates can include the radial distance, the polar angle (the angle the direction to the respective reflecting surface makes with the vertical direction or a horizontal plane), and the azimuthal angle (the angle indicating the direction within the horizontal plane). The radial distance can be determined from the lidar data whereas the angles can be independently known from a synchronizer data, a clock data, e.g., based on the known scanning frequency within the horizontal plane.

The perception system 132 can include a hub operations control module (HOCM) 131 to perform various pre-mission and post-mission operations during the ADT stays at one or more hubs associated with the trucking mission, as described in more detail below. HOCM 131 may use instructions stored on the ADT as well as instructions that may be received from a control center (dispatch center) over any suitable communication channel, e.g., over radio, local area network protocol, personal area network protocol, satellite radio, and the like.

The perception system 132 can further receive information from a GNSS transceiver (not shown) configured to obtain information about the position of the ADT relative to Earth. The GNSS data processing module 134 can use the GNSS data in conjunction with the sensing data to help accurately determine location of the ADT with respect to fixed objects of the driving environment 110, such as roadways, lane boundaries, intersections, sidewalks, crosswalks, road signs, surrounding buildings, and so on, locations of which can be provided by map information 135. In some implementations, other (than GNSS) measurement units (e.g., inertial measurement units, speedometers, accelerometers, etc.) can also be used (alone or in conjunction with GNSS) for identification of locations of the ADT relative to Earth. Additional tools to enable identification of locations can include various mapping algorithms based on data obtained by the perception system 132, which can be used (together with or separately from) map info 135. In some implementations, the data processing system 130 can receive non-electromagnetic data, such as sonar data (e.g., ultrasonic sensor data), temperature sensor data, pressure sensor data, meteorological data (e.g., wind speed and direction, precipitation data), and the like.

The data processing system 130 can further include an environment monitoring and prediction component 136, which can monitor how the driving environment 110 evolves with time, e.g., by keeping track of the locations and velocities of the animated objects (relative to Earth). In some implementations, the environment monitoring and prediction component 136 can keep track of the changing appearance of the environment due to motion of the ADT relative to the environment. In some implementations, the environment monitoring and prediction component 136 can make predictions about how various animated objects of the driving environment 110 will be positioned within a prediction time horizon. The predictions can be based on the current locations and velocities of the animated objects as well as on the tracked dynamics of the animated objects during a certain (e.g., predetermined) period of time. For example, based on stored data for object 1 indicating accelerated motion of object 1 during the previous 3-second period of time, the environment monitoring and prediction component 136 can conclude that object 1 is resuming its motion from a stop sign or a red traffic light signal. Accordingly, the environment monitoring and prediction component 136 can predict, given the layout of the roadway and presence of other vehicles, where object 1 is likely to be within the next 3 or 5 seconds of motion. As another example, based on stored data for object 2 indicating decelerated motion of object 2 during the previous 2-second period of time, the environment monitoring and prediction component 136 can conclude that object 2 is stopping at a stop sign or at a red traffic light signal. Accordingly, the environment monitoring and prediction component 136 can predict where object 2 is likely to be within the next 1 or 3 seconds. The environment monitoring and prediction component 136 can perform periodic checks of the accuracy of its predictions and modify the predictions based on new data obtained from the sensing system 120.

The data generated by the perception system 132, the GNSS data processing module 134, and the environment monitoring and prediction component 136 can be used by an autonomous driving system, such as autonomous vehicle control system (AVCS) 140. The AVCS 140 can include one or more algorithms that control how the ADT is to behave in various driving situations and environments. For example, the AVCS 140 can include a navigation system for determining a global driving route to a destination point. The AVCS 140 can also include a driving path selection system for selecting a particular path through the immediate driving environment, which can include selecting a traffic lane, negotiating a traffic congestion, choosing a place to make a U-turn, selecting a trajectory for a parking maneuver, and so on. The AVCS 140 can also include an obstacle avoidance system for safe avoidance of various obstructions (rocks, stalled vehicles, a jaywalking pedestrian, and so on) within the driving environment of the ADT. The obstacle avoidance system can be configured to evaluate the size of the obstacles and the trajectories of the obstacles (if obstacles are animated) and select an optimal driving strategy (e.g., braking, steering, accelerating, etc.) for avoiding the obstacles.

Algorithms and modules of AVCS 140 can generate instructions for various systems and components of the vehicle, such as the powertrain 150, brakes 152, steering 154 vehicle electronics 160, suspension 156, signaling 170, and other systems and components not explicitly shown in FIG. 1A. The powertrain 150 can include an engine (internal combustion engine, electric engine, and so on), transmission, differentials, axles, and wheels. The vehicle electronics 160 can include an on-board computer, engine management, ignition, communication systems, carputers, telematics, in-car entertainment systems, and other systems and components. The signaling 170 can include high and low headlights, stopping lights, turning and backing lights, marker lights and other lights used to signal to other road users as well as horns and alarms, inside lighting system, dashboard notification system, passenger notification system, radio and wireless network transmission systems, and so on. In some implementations, signaling 170 can include automated emergency signaling (AES) 172 to implement enhanced illumination of stranded vehicles and deployment of warning devices, as described in more detail below. Some of the instructions output by the AVCS 140 can be delivered directly to the powertrain 150, brakes 152, steering 154, signaling 170, etc., whereas other instructions output by the AVCS 140 are first delivered to the vehicle electronics 160, which generate commands to the other components of the vehicle.

In one example, the AVCS 140 can determine that an obstacle identified by the data processing system 130 is to be avoided by decelerating the vehicle until a safe speed is reached, followed by steering the vehicle around the obstacle. The AVCS 140 can output instructions to the powertrain 150, brakes 152, and steering 154 (directly or via the vehicle electronics 160) to 1) reduce, by modifying the throttle settings, a flow of fuel to the engine to decrease the engine rpm, 2) downshift, via an automatic transmission, the drivetrain into a lower gear, 3) engage a brake unit to reduce (while acting in concert with the engine and the transmission) the vehicle's speed until a safe speed is reached, and 4) perform, using a power steering mechanism, a steering maneuver until the obstacle is safely bypassed. Subsequently, the AVCS 140 can output instructions to the powertrain 150, brakes 152, and steering 154 to resume the previous speed settings of the vehicle.

Figure 1B:
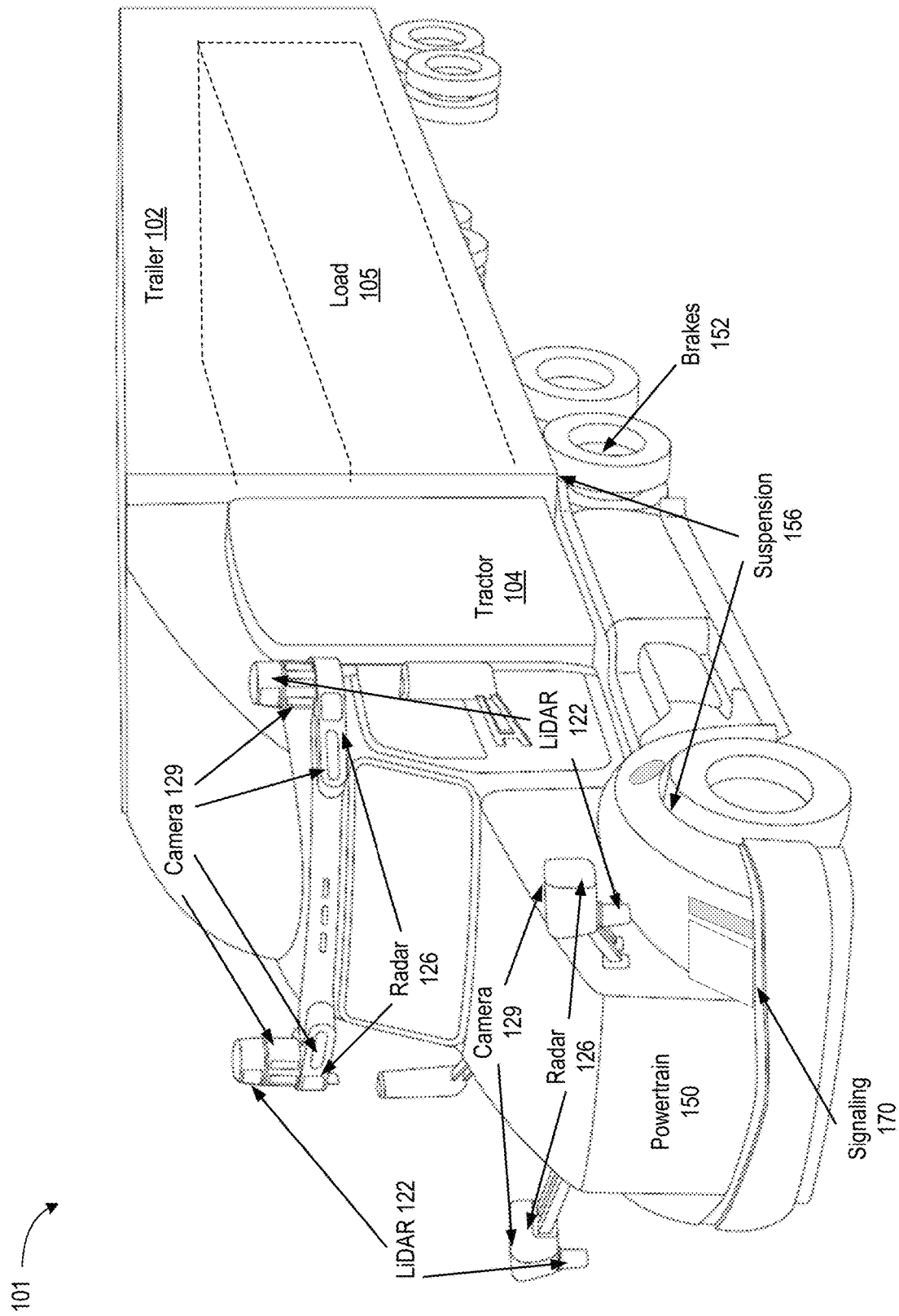
FIG. 1B is a schematic depiction of an autonomously driven truck-trailer combination capable of performing one or more described techniques, in accordance with implementations of the present disclosure

FIG. 1B is a schematic depiction of an autonomously driven truck-trailer combination 101 capable of performing one or more described techniques, in accordance with implementations of the present disclosure. Autonomously driven truck-trailer combination 101 can include a tractor 104 and a trailer 102, which can be loaded with a load 105. Depicted schematically are some of the systems of the autonomously driven truck-trailer combination 101, such as lidar(s) 122, radar(s) 126, camera(s) 129, powertrain 150, brakes 152, suspension 156, signaling 170. Numerous other systems are not indicated, for conciseness.

Transfer Hubs

An ADT-facilitated load delivery that begins from an origination location (e.g., a shipping agent's loading dock) and proceeds directly to a destination location (e.g., a customer's warehouse or a distribution center) can present significant technical challenges and result in substantial costs that can reduce cost efficiency of trucking operations at large scale. For example, an origin location and/or a destination location can be located within heavily trafficked (e.g., within a major city) and/or heavily regulated (e.g., gated and secured) areas. Getting to/from such locations can involve an amount of street driving. Autonomous vehicle driving in a city setting or other heavily trafficked/regulated locations can involve detailed mapping of the respective areas, which can come at additional operating costs, demands to computational and memory resources of ADTs, and so on. Operating ADTs within major urban areas can further increase insurance costs and costs of compliance with various laws and regulations. Highway driving can involve a structured environment amenable to robotic operations. In some instances, highway driving can be performed with reduced mapping data compared with mapping data for urban driving. On the other hand, urban driving can give rise to a larger variety of different driving situations whose successful resolution is facilitated by intuition and human experience.

To improve efficiency, safety, and costs of autonomous trucking operations, aspects and implementations of the present disclosure enable transfer hub operations. A transfer hub may be located at or near a highway or at some other location that has a convenient access to a highway, for example, an access that does not involve driving through an urban setting to/from the hub or an access that involves a limited amount (e.g., less than a threshold distance) of urban (street driving). In some implementations, a hub can be used as a location where a load, e.g., a trailer with products being shipped, is received, processed, paired with a ADT, and dispatched on a driving mission. In some implementations, a second hub can be similarly located in some reasonable proximity to a destination point but also in a location that has a convenient access to the highway. A long-distance ADT configured for efficient highway driving (or a fleet of such ADTs) can transport loads between the hubs. In some implementations, a human-operated truck or an ADT configured for local driving can deliver loads from a location of origin to the first hub. Likewise, another human-operated truck or another ADT configured for local driving to/from the second hub can ensure delivery of the loads to the destination. Various operations that involve ADTs at the first hub and/or the second hub can be performed as described in the present disclosure.

Figure 2:
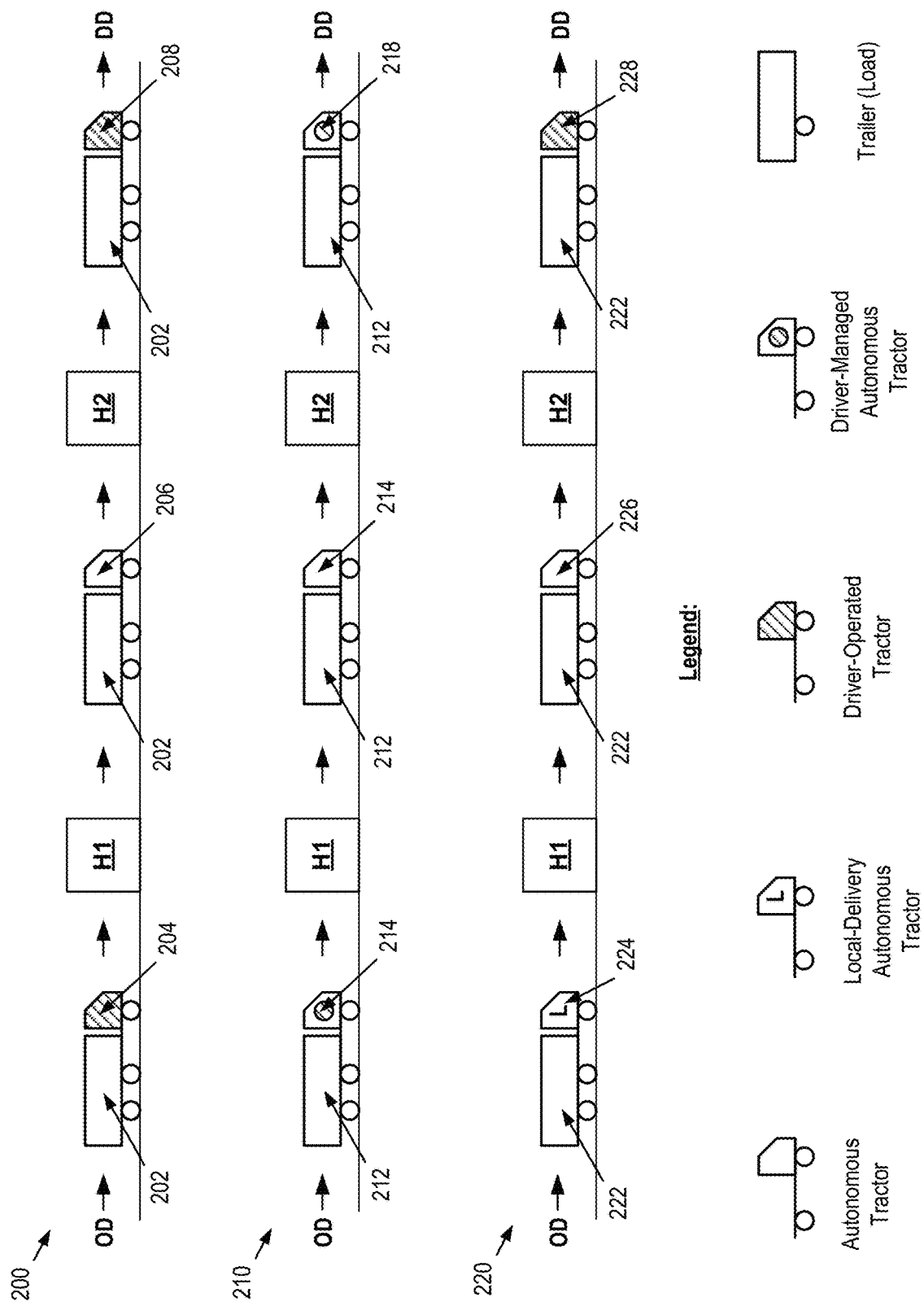
FIG. 2 is a schematic depiction of a number of implementations of hub operations to enable efficient and cost-effective load delivery using autonomously driven trucks, in accordance with some implementations of the present disclosure.

FIG. 2 is a schematic depiction of a number of implementations of hub operations to enable efficient and cost-effective load delivery using autonomously driven trucks, in accordance with some implementations of the present disclosure. In implementation 200, depicted is a trailer 202 carrying a load and being delivered from an origin depot (OD) to a first hub H1 by a driver-operated tractor 204. OD can be any place where load is assembled and placed in trailer 202, added to trailer 202, inspected, rearranged, repaired, and so on. For example, OD can be a warehouse of a shipping agent, a distribution facility of the shipping agent, a retail facility, a wholesale facility, a loading dock, a maritime unloading dock, a railroad unloading dock, or any other place of load transfer, assembly and/or inspection.

Trailer 202 can include any type of a load carrier that can be transferred, over public or private roads of any surface types (paved or unpaved), by any vehicle, including trucks, tractors, operating on wheels or tracks, capable of towing a trailer. For example, driver-operated tractor 204 can be a cabin-over-engine tractor, a conventional tractor (where the cabin is located behind the engine compartment). Driver-operated tractor 204 can have two axles, three axles, or any other number of axles. Trailer 202 can be connected to tractor 204 using any hitches or hitching devices (e.g. the "fifth wheel" hitching device). Driver-operated tractor 204 can deliver trailer 202 from OD to hub H1 over local roads, streets of a city, town, or any other developed urban area, developed rural area, undeveloped rural areas, using highways, tollways, freeways, or any other roads.

At hub H1, as depicted in FIG. 2, implementation 200 can involve disconnecting trailer 202 from driver-operated tractor 204 and connecting trailer 202 to an autonomous tractor (ADT) 206, as described in more detail below. Autonomous tractor 206 can deliver trailer to a second hub H2 over a highway or any other road or a combination of roads that are mapped for safe and efficient operations of autonomous tractor 206. In some implementations, one or more of hubs H1 and H2 can be located in a vicinity of a highway or at a location that allows an access to a highway. The access need not be over a short distance, but may be over roads that avoid major urban developments. At hub H2, implementation 200 can involve disconnecting trailer 202 from autonomous tractor 206 and connecting trailer 202 to another driver-operated tractor 208 (as described in more detail below) to deliver trailer 202 to a destination depot (DD). Similarly to OD, DD can be any place where load is inspected and removed from trailer 202 for delivery to a receiving customer. DD can also be any place where the load is rearranged, repackaged, added to and shipped to a different destination. For example, DD can be a warehouse of a customer, a receiving agent of a customer, a distribution facility of the receiving agent, a retail facility, a wholesale facility, an unloading dock, a maritime loading dock, a railroad loading dock, or any other place of load transfer, assembly, and/or inspection.

In implementation 210, depicted is a trailer 212 carrying a load and being delivered from OD to hub H1 by a driver-managed autonomous tractor 214. Unlike autonomous tractor 206 that is traveling between hubs H1 and H2 (and other hubs, in a multi-hub system) and stationed at hubs H1 or H2 between trucking missions, driver managed autonomous tractor 214 can be stationed either at hub H1 or at OD. Driver-managed autonomous tractor 214 can be configured (e.g., can have requisite mapping data) to perform trucking missions between hubs H1 and H2 (and/or other hubs). In some implementations, an operator (driver) of driver-managed autonomous tractor 214 can operate the tractor in a conventional (driver-operated) mode between OD and hub H1. Subsequently, driver-managed autonomous tractor 214 can be configured for an autonomous travel between hub H1 and hub H2, trailer 212 can (optionally) be verified and assessed as described below, and the vehicle can depart to hub H2. In the meantime, driver can drive another tractor/load combination (e.g., delivered to hub H1) back to OD. In some implementations, the operator (driver) of driver-managed autonomous tractor 214 can oversee (without actively driving it) operations of tractor 214 while tractor 214 takes trailer 212 from OD to hub H1. For example, tractor 214 can also be configured for autonomous driving between OD and hub H1 (and back). In such implementations, the driver may observe or manage operations of 214 during OD-to-H1 load delivery without being actively involved in driving tractor 214 or being involved in such driving to a reduced degree. For example, during OD-to-H1 load delivery, the driver can go over a checklist of things to verify that various systems of tractor 214 (mechanical, electrical, sensing and data processing, braking, steering, etc.) are operating correctly. The driver can further verify that AVCS 140 of tractor 214 is operating according to requisite safety and efficiency standards. If any deviation from such standards is detected, the driver can adjust the settings of tractor 214, reboot respective autonomous driving systems, call for additional technical assistance, abort the mission, select a different autonomous tractor at hub H1 for delivery of trailer 222 to hub H2, or perform any other remedial operations. Driver-managed autonomous tractor 214 can be of any tractor type listed above for driver-operated tractor 204.

At hub H1, upon completion of verification procedures, the driver of the driver-managed autonomous tractor 214 can initiate an autonomous mode for tractor 214 and the vehicle can depart for hub H2. After tractor 214 has delivered trailer 212 to hub H2, another driver-managed autonomous tractor 218 (configured for local delivery to DD) can take trailer 212 to DD. In some implementations, tractor 218 can be the same as tractor 214 with a driver from DD managing (e.g., overseeing and performing post-mission testing) driving operations of tractor 214. In some implementations, tractor 214 can be driven to DD in a driver-operated mode (e.g., substantially as tractor 208 in implementation 200.

In implementation 220, depicted is a trailer 222 carrying a load and being delivered from OD to hub H1 by a local-delivery autonomous tractor 224. Local-delivery autonomous tractor 224 can have requisite mapping data and be configured to perform local trucking missions between OD and hub H1. Subsequently, a different autonomous tractor 226 can be used for autonomous travel between hub H1 and hub H2. At hub H1 trailer 222 can (optionally) be verified and assessed as described below, and the vehicle can depart to hub H2. After tractor 226 has delivered trailer 222 to hub H2, a driver-operated tractor 228 can deliver trailer 222 to DD, as depicted in FIG. 2. In some implementations, another local-delivery or any other autonomous tractor (similar to tractor 224 but deployed for the locale of hub H2 and DD) can be used to take trailer 222 to DD. In some implementations, tractor 228 can be the same as tractor 226 with a driver from DD managing (e.g., overseeing and performing post-mission testing) driving operations of tractor 226. In some implementations, tractor 226 can be driven to DD in a driver-operated mode (e.g., substantially as tractor 228.

The implementations 200, 210, and 220 should be understood to be example implementations. Various other combinations of different parts and legs of implementations 200, 210, and 220 are possible. For example a load that is delivered from OD to hub H1 by a driver-operated tractor (e.g., as in implementation 200) can be delivered from hub H2 to DD using a local-delivery autonomous tractor, and so on. Example implementations of FIG. 2 depict two hubs H1 and H2 for conciseness and convenience only. In various implementations, the number of hubs can be more than two. For example, a network having an arbitrary number of hubs can be used. An autonomous vehicle can perform a sequence of trips, e.g., from hub H1 to hub H2, from hub H2 to hub H3, . . . to hub HN and so on, with the last segment taking the vehicle from hub HN to DD. In some implementations, any of the sections of the mission can be driven in the autonomous manual mode. For example, the trip H2→H3 can be performed in the manual (driver-operated) mode, whereas section HN→DD can be performed using an autonomous mode.

Figure 3A:
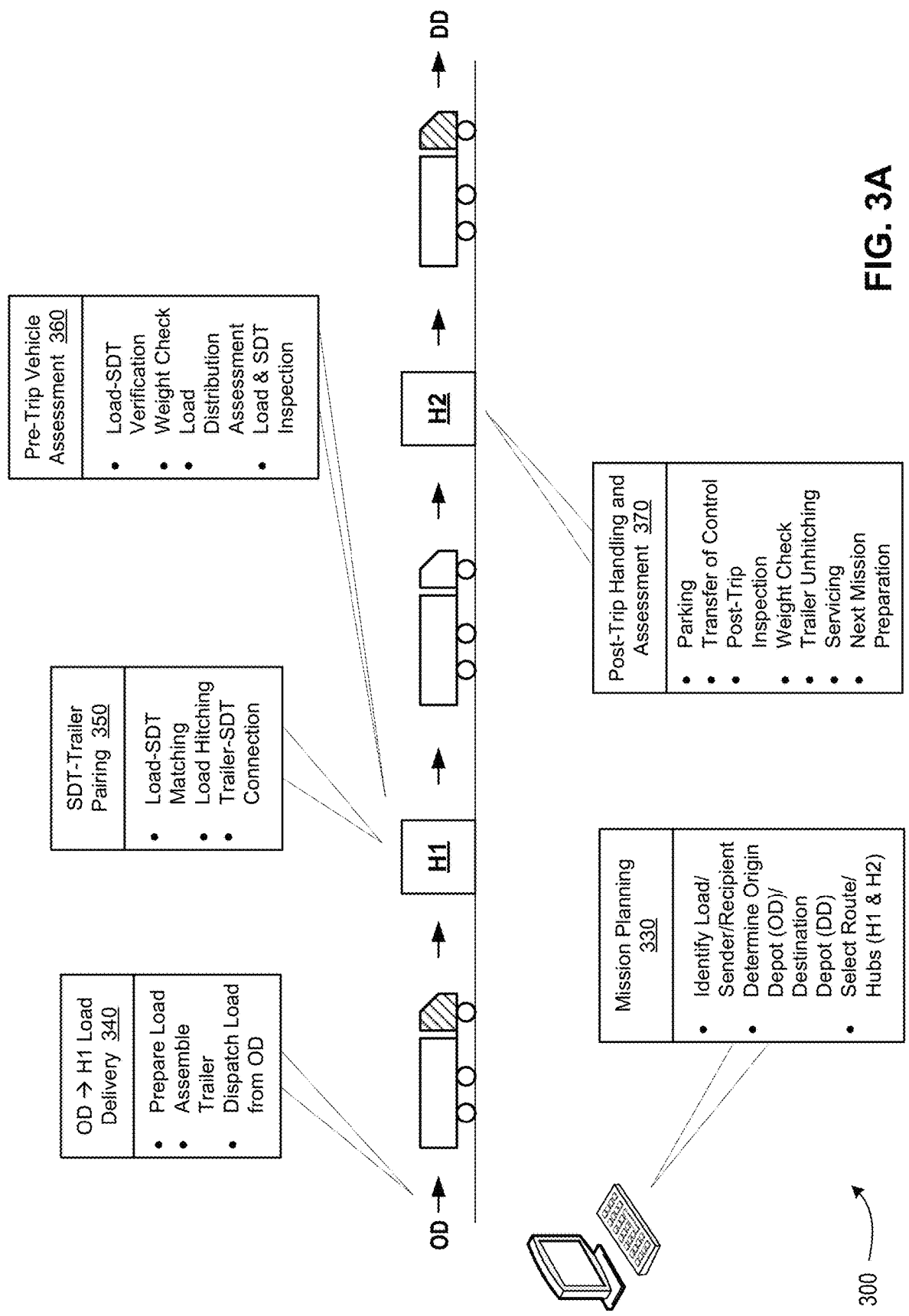
FIG. 3A is a schematic depiction of operations that can be performed to enable efficient and cost-effective load delivery using autonomously driven trucks, in accordance with some implementations of the present disclosure.

FIG. 3A is a schematic depiction of operations 300 that can be performed to enable efficient and cost-effective load delivery using autonomously driven trucks, in accordance with some implementations of the present disclosure. Operations listed in FIG. 3A can correspond to implementation 200 of FIG. 2 or to similar implementations. Load delivery can include identifying, as part of mission planning 330, a type of a load, a load sender, and a load recipient. For example, a processing device, e.g., a mission planning server (MPS) performing mission planning 330 may process an order (invoice, purchase agreement, shipment contract, etc.) from a customer identifying details of the trucking mission. The customer can be a sender (seller, shipping agent, etc.) or a recipient (buyer, receiving agent, etc.), an intermediary (e.g., a shipping company or dealer), or any other person, corporation, or business. MPS can process the load type, load weight, load volume, and any other load characteristics (fragile load, oversized load, perishable load, high priority load, etc.) to identify a type of a container/trailer that can accept the load and a type of a vehicle/tractor that can be used to haul the trailer. MPS can further choose (unless specified in the order) OD and/or DD based on proximity to highways, sender, recipient, based on expected driving time, fuel consumption, anticipated weather conditions, and so on. MPS can also select a specific route between OD and DD. In particular, MPS can access the map or listing of various hubs available for trailer/load transfer and select among available hubs such hubs H1 and H2 that are configured for operations of the identified tractor/trailer types, located sufficiently close to the selected route, to OD and/or DD, as well as other characteristics of the trucking mission to be performed.

A mission can include, as part of OD☐hub H1 load delivery 340, load preparation, trailer assembling, and dispatching the assembled trailer with load to first hub H1. For example, products selected for shipment can be packaged, protected against external forces and elements, placed in the trailer, secured inside the trailer, and so on. The assembled trailer can be dispatched, e.g., using a driver-operated tractor to hub H1.

The mission can further include, as part of ADT-Trailer pairing 350, matching of load/trailer to an autonomous tractor, hitching the trailer to the tractor, and securing various mechanical, electrical, pneumatic, hydraulic, and other connections (e.g., wires, lines, radio communication channels, and the like) between the tractor and the trailer. The mission can also include, as part of vehicle assessment 360, verification that the correct load has been attached to the autonomous tractor, that the vehicle (and/or each of its axles) weighs within a maximum allowed for the type of the vehicle and the route selected (e.g., roads, bridges, overpasses, etc., that the vehicle is to travel), that the load distribution (e.g., inside the trailer) is within an acceptable range of parameters (e.g., location and height of the center of mass) for the type of the tractor being used, type of a driving mission and a driving environment, operational design domain, and so on. Additionally, as part of assessment 360, load can be inspected to determine whether the load is secured, properly marked, compliant with safety and traffic regulations, and so on. Additionally, as part of assessment 360, vehicle can be inspected to ensure that all systems and mechanisms are properly operating, e.g., all lines and cables are properly connected, lights and signals of the tractor and the trailer are properly coordinated, fuel tank has an appropriate amount of fuel for the upcoming mission, fluids have appropriate level and pressure, and so on.

After the trip from hub H1 to hub H2 is completed, the autonomous vehicle can undergo a number of post-trip handling and assessment 370 operations. In some implementations, such operations can include some or all of the following: parking the vehicle at a staging area, a human operator taking control of the vehicle, moving the vehicle to an unhitching area, disconnecting the trailer from the tractor (which can include unhitching the trailer, disconnecting various mechanical, electric, pneumatic, and hydraulic lines), post-trip inspection of the load, trailer, and tractor, weight check of the trailer and the tractor, servicing the tractor and preparation for the next mission, which can include washing the tractor, checking/adding fluids, refueling the tractor, servicing/replacing software and data logs, and the like.

Figure 3B:
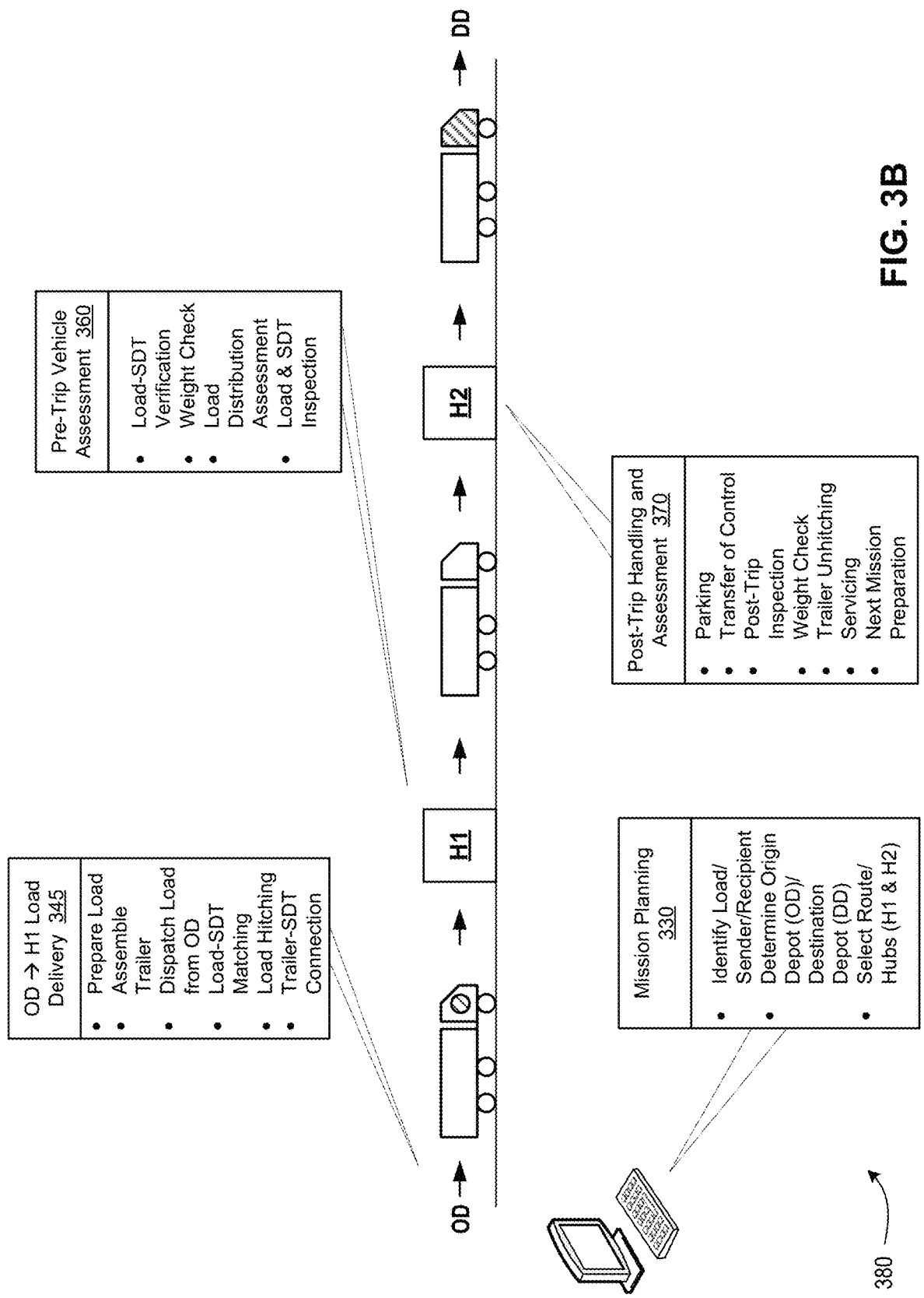
FIG. 3B is another schematic depiction of operations that can be performed to enable efficient and cost-effective load delivery using autonomously driven trucks, in accordance with some implementations of the present disclosure.

FIG. 3B is another schematic depiction of operations 300 that can be performed to enable efficient and cost-effective load delivery 380 using autonomously driven trucks, in accordance with some implementations of the present disclosure. Operations listed in FIG. 3B can correspond to a combination of implementations 200 and 210 of FIG. 2 or to similar implementations. More specifically, in some implementations, the trailer can be delivered from OD already connected to the autonomous tractor that is to haul the trailer from hub H1 to hub H2. In such implementations, operations of OD☐H1 load delivery (block 340 in FIG. 3A) and ADT-trailer pairing (block 350 in FIG. 3A) can be performed prior to the autonomous vehicle arrival at hub H1. As illustrated with block 345 in FIG. 3B, some or all of the following operations can be performed at OD: load preparation, trailer assembling, matching of load/trailer to an autonomous tractor, hitching the trailer to the tractor, securing mechanical, electrical, pneumatic, hydraulic, and other connections between the tractor and the trailer, verification that the correct load has been attached to the autonomous tractor, that the vehicle (and/or each of its axles) weighs within a maximum allowed for the type of the vehicle and the route selected, verification that the load distribution (e.g., inside the trailer) is within an acceptable range of parameters (e.g., location and height of the center of mass) for the type of the tractor being used, and so on. In some implementations, some of the operations listed in conjunction with block 345 can be performed at hub H1.

Load Weighing, Verification, and Assessment

In some instances, load weight as stated on the bill of lading (provided by a shipping agent) can be incorrect. In some implementations of the present disclosure, transfer hub systems overseeing autonomous mission preparation can be capable of detecting such errors prior to commencing the trip between hub H1 and hub H2 and avoiding potential problems during load reception at DD or hub H2 when it is established that the weight of the load does not match the weight stated in the bill of lading. To prevent such potential problems, the trailer with the load can be driven by the autonomous tractor over a weight scales, each axle of the vehicle and/or each wheel can be weighed and both the weight of the load and the horizontal coordinates of the center of mass of the load can be determined, e.g., by data processing system 130 of the autonomous vehicle or by a processing system of the weight station. For example, the weight of the tractor (without fuel and/or with fuel and other fluids added to the tractor in preparation for the trip) can be known to the data processing system 130. Also known can be distribution of the weight of the tractor between the two (or more) axles of the tractor, weight of the trailer (of the specific type chosen for the trucking mission), additional weight added by the empty trailer to each of the tractor's axles and weight distribution of the trailer among various axles of the trailer. Based on this data for the tractor and the empty trailer and the actual measured weights for the loaded vehicle, the data processing system can determine both the longitudinal coordinate (along the length of the vehicle) of the center of mass of the load and the load's weight. In some implementations, the scales can be equipped with separate sensors for the left and right wheels of the vehicles. As a result, measurement of the differences between the weight on each wheel (or pairs of wheels) for each axle, data processing system 130 (or the processing system of the weight station) can determine the coordinate of the center of mass of the load in the transverse (across the width of the vehicle) direction. In some implementations, the height of the center of gravity can be determined by causing the autonomous vehicle to drive to a shaker platform large enough to accept the full length/width of the trailer, or tractor, or both, and determining a mechanical response of the vehicle to vibrations or other types of motions of the shaker platform. The weighing data can further allow to determine how evenly the load is distributed along the length/width of the trailer. For example, excessive weight of the rearmost axle of the trailer can indicate that the load is predominantly positioned near the rear of the trailer, a similar excessive weight added to the rear axle of the tractor can signal that most of the load is located near the front of the trailer.

Weighing axles helps to ensure that the vehicle is compliant with driving laws and regulations, whereas identifying the location of the center of gravity of the tractor and/or trailer can be used for improving efficiency and performance of the autonomous vehicles, including maximizing safety of autonomous driving operations.

In some implementations, weighing of the autonomous vehicle can be performed using dynamic scales, for determination of the height of the load distribution. Dynamic scales can use different forces to impart different impulses to different axles and different wheels within the axles and measure a dynamic (as a function of time) weight response of various axles/wheels, as the vehicle bounces up and down (or left and right) under the forces of gravity, elastic tension of the vehicle's suspension, and so on. Data processing system 130 (or the processing system of the weight station) can have information about weight distribution of the tractor and empty trailer, rigidity and height of the suspension of the vehicle (both of the tractor and the empty trailer). In some implementations, prior to dynamic weighing, AVCS 140 of the autonomous vehicle can change the setting of the vehicle's suspension to a special weighing mode. For example, the suspension can be set into the hardest configuration (maximum rigidity/stiffness) and raised to the maximum height. In other implementations, other settings can be used. In some instances, a number of configurations, characterized by different suspension rigidities and/or height can be used for additional data. After the distribution of the load along various directions (longitudinal, transverse, vertical) has been determined, the distribution can be stored in memory of data processing system 130, AVCS 140 (or any other memory device accessible to AVCS 140) and used by AVCS 140 for autonomous driving operations (e.g., for determining speed, cornering, etc., during turning, acceleration, and braking maneuvers).

In some implementations, weighing can be performed iteratively. For example, after axle/wheel weighing and/or determining the location of the center of mass of the trailer (and/or the tractor), weight distribution can be modified and a new weighing can be performed, and so on. In some implementations, data processing system 130 can execute an algorithm that analyses the weight information and outputs suggested changes to the load distribution and the vehicle setup, which can be implemented by the hub personnel. Some changes can be mandated by driving regulations, for example, weighing can indicate that the position of the fifth wheel or/and the rear axle of the trailer is to be modified to reduce weight of some axle(s) of the vehicle to bring the vehicle into compliance with regulations. Alternatively, weighing can indicate that the load (or a part of the load) is to be shifted forward, backward, left right, down, etc. within the trailer, and so on. After suggested changes are implemented by the hub personnel, automated weighing can be repeated and the new weight distribution can be determined. If the new distribution is still suboptimal, additional instructions can be output by data processing system 130. Iterative weighing of axle weights and adjusting fifth wheel and rear trailer axle positions might be required to stay within the legal weight limits for the route. This iterative process could be supported by an algorithm that analyses the weight information and then proposes adjustments to minimize the number of iterations required. Such a process can reduce time that the ADT spends at a hub in preparation for a driving mission.

In some implementations, X-ray detectors and sound detectors can be used to screen loads inside loaded (and, optionally, sealed) trailers. For example, an autonomous vehicle can pull to an inspection location and a robot equipped with a sensor can move alongside the trailer and produce X-ray, infrared, or ultrasound images of objects therein. In some implementations, the sensor can be stationary whereas the autonomous vehicle can drive, at a predetermined speed along the sensor while the sensor produces images of the objects inside the trailer. In some implementations, multiple sensors (e.g., located on opposite sides of the trailer, above the trailer, below the trailer, and so on) can be used. The sensing data can be used to map a distribution of the load inside the trailer and determine whether the load is distributed evenly or predominantly near one of the side walls of the trailer, near the front/back of the trailer, and so on. In some implementations, sensors can scan the inside of the trailer to determine if any illegal material is present inside the trailer, such as weapons, combustible materials, or any objects whose response to the sensors is inconsistent with the load manifest (e.g., presence of a quantity of metal whereas the load manifest only indicates articles of clothing or office furniture. In some implementations, sensors detecting presence of odors and various gaseous substances near a trailer can similarly be positioned at or around the inspection location.

Automated Refueling and Trailer Hitching/Unhitching

The existing autonomous vehicle technology often relies on manual servicing of tractors and trailers prior and after autonomous driving missions. Automation of servicing of the vehicles can further improve efficiency of autonomous vehicles. Hitching and unhitching of trailers to and from tractors is one of the tasks that can be automated. In some implementations, hub H1 and/or hub H2 can have designated areas for hitching and unhitching. In some implementations, hitching and unhitching can be robot-assisted. During automated unhitching, the autonomous vehicle can drive to a designated parking spot and stop at a predetermined location. The designated parking spot can be mapped in the memory of the autonomous vehicle and can be marked with lines, lights, equipped with emitters of sound and/or electromagnetic waves (e.g., radio waves, infrared waves, visible light wave, or any other similar signals) or sensors (transceivers) capable of a two-way communication. Sensing system of 120 ADT can identify the designated parking spot area and AVCS 140 can guide ADT to this parking spot. In some implementations, multiple sensors helping ADT can be arranged in a triangulation setup to enable ADT to stop at a target located within the designated parking spot with a target accuracy (e.g., within 50 cm, 10 cm, or any other target distance from reference lines or objects). After the ADT has stopped at the target location, a lifting robot can move in (e.g., from a station located to a side of the parked ADT) to a target position underneath the front end of the trailer and behind the rear end of the tractor (or to any other target position). The lifting robot can bear the weight of the trailer and lift the trailer to allow unhitching of the trailer from the tractor. The unhitching can use safety interlocks and can be synchronized with the leveling of the rear axle and the disengagement of the kingpin from the fifth wheel.

In some implementations, the lifting robot can obviate the need to have or use trailer landing gear. For example, after unhitching the trailer, the lifting robot can take the trailer directly to a docking location for unloading (loading) or to a parking area (thus, performing a function of a tow truck). In some implementations, the lifting robot can interact with a tow truck to perform an automated seamless hand-over of the trailer to the tow truck. Such a dedicated tow truck (with the layout of the respective hub mapped in the tow truck's memory) can then attach to the trailer and move the trailer to a loading and/or unloading area.

Trailer hitching can be performed in a reverse manner. The dedicated tow truck can deliver the trailer to a target position in the dedicated hitching/unhitching parking spot and the robot can (temporarily) support the weight of the trailer (or the front end of the trailer). In some implementations, the ADT can then back towards the trailer using ADT's sensing system 120 and/or outside sensors, as described above in relation to unhitching, until the desired mutual positioning of the tractor and the trailer is achieved. The robot can then release the weight of the trailer and/or lower the trailer onto the bed of the tractor and the hitching can be performed. In some implementations, the tractor can remain stationary while the robot can push the trailer toward the tractor until the desired mutual positioning of the tractor and the trailer is achieved.

In some implementations, autonomous vehicles can be refueled automatically, without involvement of a human operator. For example, a refueling robot can approach an autonomous vehicle (e.g., tractor with or without a trailer) and identify a correct refueling nozzle. For example, the refueling robot can scan a barcode that includes refueling information, such as the size of the nozzle that is to be used in refueling, the type of the fuel or other energy source used by the vehicles (e.g., gasoline, diesel, electric). Alternatively, the refueling robot can determine the size of the nozzle and the fuel type after the robot removes the fuel cap. In some instances, identification of a correct refueling nozzle can be performed by the refueling robot; e.g. The robot can execute a predetermined pattern of movements to sense the nozzle-receiving equipment of the autonomous vehicle (e.g., by detecting/recognizing one or more reference features of the nozzle-receiving equipment recognition, by. The refueling robot can then connect a refueling line (gasoline or diesel line, electric cord, etc.) to the vehicle. Similarly, any fluid can be added to the autonomous vehicle in a similar way, e.g., a diesel exhaust fluid (in vehicles equipped with selective catalytic reduction technology) or any other liquid that is to be replenished regularly can be added. In addition, the refueling robot can have leak sensors (e.g., chemical sensors or optical sensors) to detect leaking fluids and gases. Using leak sensors, the refueling robot can identify leaks that might occur during and cease refueling and take mitigating actions before a hazardous situation has a chance to develop (e.g., issuing an alarm, detaching the refueling equipment, verifying whether the nozzle is of the correct type, reattaching the nozzle, restarting the refueling, neutralizing/cleaning the leaked fluids, and so on). In some implementations, the refueling robot can use its sensing system to determine the presence of humans within a protected area around the refueling station or equipment. In the instances when a human enters the protected area, the refueling robot can stop (e.g., temporarily, until the human(s) leave(s) the protected area) the flow of the fluids (or disengage the fueling equipment) to prevent potentially hazardous situations from developing. A correct amount of fluid(s) delivered into the autonomous vehicle can be determined using various shut off mechanisms (e.g., pressure-sensing mechanisms, sound echo mechanisms, optical or other electromagnetic mechanisms) when predetermined amounts of respective fluids have been delivered.

Automatic Visual Inspection

Automated visual inspection of assembled tractor-trailer combinations can save human power and identify potential problems before such problems have a chance to develop. Currently, inspections can be performed by fleet personnel and determine whether the trailer is properly hitched to the tractor, whether all lines and cables between the tractor and the trailer are connected correctly, that all signaling devices are operational, and so on. Even though personnel inspections are often performed using checklists, a possibility of a human attention or perception problem always remains. In some implementations of the present disclosure, automated visual inspection can be performed by a sensing system of another autonomous vehicle (e.g., a hub safety vehicle), a ground sensing system of the hub, or a combination thereof. In some implementations, data from a sensing system of the autonomous vehicle being inspected can also be used during the performance of the automated inspection. A device that processes collected sensing data can be a processing device located on the hub safety vehicle, a processing device of the hub, data processing system 130 of the autonomous vehicle being inspected, or any combination thereof. Collected sensing data can be data from one or more lidar devices and/or camera(s). In some implementations, sensing data can be input into a classifier that can perform a comparison of geometry measurement of the autonomous vehicle of a specific vehicle type (category or model) to a ground truth for the specific vehicle type. The ground truth can include various dimensions and tolerances of the vehicle (e.g., dimensions of the tractor, the trailer, the target dimensions of the combined vehicle, the distances between the axles, the lengths and locations of lines, wires, lighting devices, and other vehicle components. In some implementations, sensing data can be input into an inspection model that can be a machine learning model, e.g., a decision tree, a vector support machine, a neural network model. The machine learning model can be trained on images of vehicles with properly connected and operating tractor-trailer combinations and on images depicting various defects in connections. Such defects can include unconnected pneumatic lines, electric lines, non-operational braking and turning lights, emergency lights, and so on. In those instances where an automated inspection signals an existence of any defects or deviations from a target configuration, the processing device processing inspection data can output an alarm signal to the hub personnel and trigger an inspection by a human operator.

A similar automated inspection can be performed upon arrival at hub H2. In such post-trip inspections, an exterior of the tractor and the trailer can be inspected to identify any damage that may have occurred during the trip that has concluded. The post-trip inspection can be performed using similar images, sensing techniques, and processing devices, as described above in relation to pre-trip inspections. Models that are used for post-trip inspections can be trained using images of vehicles that have blown tires, parts and systems of the autonomous vehicle damaged by rocks, in collisions with other vehicles, having vehicle identifiers, signaling devices, and sensors of sensing system 120 covered in mud, dust, and other substances, or vehicles having any other types of damages or abnormalities.

Parking Spot Calibration

In some implementations, a special form of calibration can be performed while an ADT remains parked in a parking spot. To facilitate continued execution of an ongoing driving mission after parking (e.g., overnight parking or any other type of temporary layover), the ADT can be shut down and, upon waking up, detect that it remains at the same place and has not been moved. In some implementations, one or more objects, signs, markings, etc., can be placed within, at or around the parking area to enable such detection. For example, a calibration structure (a pole, a billboard, a sign, etc.) can be placed near the parking area and can display patterns that are recognizable by the optical sensing system and the data processing system of the ADT as a calibration target. Likewise, markings on the pavement of the parking area can include similar calibration patterns. The calibration patterns can be of a type that is not commonly found on other objects, including tractors, trailers, gas tankers, buildings, plants, etc. For example, one calibration pattern can be a barcode (placed on a billboard or pavement) that is sufficiently large to be visible from a variety of locations of the parking lot. As another example, another calibration pattern can be an image of a distinct collection of geometric figures (circles, polygons, lines, etc.). In some implementations, calibration targets can be beacon devices that emit a special pattern of signals, e.g., light (visible or infrared) signals, radio signals (which may include signals at the border of radio and microwave domains, such as 2.4-5 MHz signals or signals transmitted using other cellular bands), sound signals (including ultrasound signals) emitted by targets, and the like. Numerous other calibration patterns/targets can be used, including combinations of patterns/targets of multiple types. Calibration targets can be placed in strategic places so the ADT (e.g., using ADT's data processing system) can sense these targets when turning on/off. An ADT that arrives at the parking lot can determine, using the ADT's data processing system, locations of one or more calibration targets visible to the ADT's sensing system (cameras, lidars, radio) prior to the ADT's systems shutdown. The ADT can also (optionally) obtain images of the calibration targets. In some implementations, the ADT can determine distances from the calibration targets (e.g., calibration beacons) and (optionally) determine the location (and orientation) of the ADT via triangulation techniques. The ADT can store the obtained images and locations of the calibration targets as an ADT localization state. Subsequently, upon the ADT's systems turning back on, the sensing system can obtain new images and locations of the calibration targets (while ignoring the changes in lighting, which can be caused by the passage of time and weather changes) and determine, by comparing a new localization state to stored localization state whether the ADT has remained stationary during the shutdown or has been transported to a different location by the hub personnel. For example, it may be determined if the angular sizes and orientations of the image of one or more visible calibration targets are the same as the angular sizes and orientations of the corresponding images in the stored localization states. As a result, the data processing system can determine that both the location and orientation of the ADT have not changed since the last shutdown. Consequently, the ADT can load its previous data (e.g., details of a driving mission, road map data, load data, and the like) and continue its driving mission, or other types of operations, as configured prior to the shutdown.

A hub can have a system configured to monitor human presence and human activity therein. On one hand, monitoring human activity can detect and prevent tampering with autonomous vehicles (trailers, tractors, or both), prevent theft or any other criminal or illicit actions involving autonomous vehicles. On the other hand, monitoring the presence of people within the hub (e.g., loading, unloading, testing, refueling areas) can improve safety of autonomous vehicle operations, including improving safety of humans around parked or moving autonomous vehicles. In some implementations, some or most sensors of vehicles' sensing systems can remain active or in a sleep mode (capable of transitioning into the active mode subject to a detecting and indicia of activity) and can monitor the environment for presence of people. Sensing systems of multiple vehicles can communicate with each other to ensure coverage of as broad an area as possible. For example, a blind spot of one vehicle can be within the sensing system's view of another vehicle. Information from multiple autonomous vehicles may be collected by a single computing device (or otherwise made available to the computing device), which can be a hub-based computing device or a data processing system of one of the vehicles currently located within the hub. Once a human presence/activity is detected the computing device and sensing systems of several vehicles can take some or all the following actions: emit a sound (e.g., a voice communications) and/or visual alarm to warn people that they have entered an unsafe or restricted area, begin recording images of the environment (using cameras, lidars, and other sensing devices), notify fleet, security personnel and/or police, and so on. Various actions of people can generate alarms based on threshold conditions. For example, when a person enters a Level-1 restricted area (relatively far from the vehicles/loading/testing area), a sound/visual alarm may be output; when the person enters a Level-2 restricted area (e.g., closer to the vehicles/sensitive areas), security personnel can be notifies.

Trailer-Tractor Matching

To ensure that a correct tractor is paired with a particular trailer/load combination scheduled to be delivered to a specific recipient/customer, operations of hub H1 can include verification of the tractor-trailer combination. In some implementations, each tractor can have an identifier that is accessible to a scanning device. For example, the identifier can be a barcode (a QR-code, a UPC-code, a EAN-code, or any other barcode or readable identifier) affixed to the outside of the tractor or any other location accessible to an automated scanner, which can be a stationary scanning device, a scanning device mounted on a movable object (e.g., robot), a lidar sensor, a camera-based sensor, or any other sensor. Similarly, each trailer can have a similar identifier readable by the same or separate scanning device. The identifiers on the trailer and/or tractor can be identifiers enabling unique identification of the respective trailer or tractor. During mission planning 330, after a load is assigned to a trailer, the assigned trailer can be identified in the memory of the computing device performing planning by the respective trailer identifier of the assigned trailer. Likewise, after the autonomous tractor is selected for the trucking mission, the tractor identifier can be matched with the trailer identifier and stored in the memory of the computing device. After the formation of the tractor-trailer combination at hub H1 and prior to the vehicle departing to hub H2, the vehicle can pass through a designated location (with or without stopping) and one or more scanners can scan the tractor and trailer identifiers, e.g., by uploading scanned identifiers to the computing device that performed the mission planning or by downloading identifiers stored in the memory of the computing device. If the scanned identifiers are not the same as the stored identifiers (e.g., either the tractor identifier or the trailer identifier is different), the scanning device or the mission planning computing device can cause an alarm to be generated and the departure of the vehicle to hub H2 can be aborted. In some implementations, a human operator can be called in to resolve the mismatch problem (e.g., to return the vehicle to the assembly area for a subsequent disassembly and locating the correct tractor for the trailer (or the correct trailer for the tractor). In some implementations, the identifier can be a radio-frequency identification (RFID) device, such as a radio transponder attached to the trailer. In some implementations, a Bluetooth (or any similar Wireless or Personal Area Network) connection can be established between the trailer and the tractor (or between the trailer and some other dedicated hub-based trailer/load pairing verification device, e.g., a stationary verification device). After establishing a connection, the trailer and the tractor can exchange authentication information and respective identifiers and the tractor-trailer matching can be performed.

Pre-Trip and Post-Trip Brake Inspections

Safe operations of autonomous vehicles depend on reliability of various systems and components of the vehicles. Automated checks of such systems, e.g., the braking system, can improve safety of a trucking mission, when performed prior to (or after) the mission or prior to (or after) any part of the mission, e.g., the travel between hub H1 and hub H2. A designated brake-testing area can be designated at hub H1, where the tractor or the assembled tractor-trailer combination can perform pre-trip (or post-trip) brake inspections without human intervention or with minimal human intervention. The brake-testing area can be a designated lane, an elongated parking spot, or a similar area of hub H1 (or hub H2). Some or a part of the brake-testing area can be on an uphill or downhill section of the road surface. In some implementations, a special dedicated testing tractor can be used to test brakes of a trailer. This can have an advantage that trailers can be tested before an autonomous tractor arrives for trailer pick-up, reducing time for forming mission-ready vehicles. In some implementations, a dyno (dynamometer) testing robot can be used in place of the testing tractor. The dyno robot can attach to a (loaded) trailer and simulate forces exerted on the trailer during uphill/or downhill motion. The robot can connect to electrical, pneumatic, and other systems of the trailer and cause the braking systems of the trailer to operate during dyno testing as if operating on an actual highway. After arriving at the brake-testing area, the autonomous vehicle can perform some or all of the following tests: static testing of the trailer parking brake, stationary test of the tractor parking brake, static testing of both the trailer and the tractor parking brakes, dynamic (e.g., after an accelerated motion of the tractor or the tractor-trailer combination) test of service brake (and/or a secondary brake) of the trailer, dynamic brake test of the combination of the tractor and trailer service (and/or secondary) brakes. In various implementations, the order of brake testing can be performed in different orders. In one exemplary implementation, the vehicle can enter the designated brake testing area and stop on a downhill section of the area to perform static testing of parking brakes. The vehicle can then accelerate downhill (optionally, several times) to 5-10 mph to perform a series of dynamic tests of service (and/or secondary) brakes. Some of the tests can involve bringing the vehicle to a complete stop whereas some of the tests can result only in the vehicle slowing down without stopping completely.

In some implementations, brake testing can be performed in the pull-through parking spots. The parking spots can be sufficiently long to enable one or more acceleration-braking cycles without the vehicle leaving the parking spot. In some implementations, the parking spots can be angled relative to an entry lane and an exit lane, the angles being such that the vehicle can negotiate the entry and/or exit without moving into other (e.g., parallel) parking spots or without having to stop or significantly slowing down. In some implementations, the parking spots can have markings visible to the sensing systems of the vehicle. The markings can indicate locations where the vehicle is to begin acceleration, braking, or to test parking brakes. In some implementations, sensors (e.g., infrared, radio, etc.) capable of exchanging data with the vehicle's data processing system can be used to guide the autonomous vehicle through the brake-testing routine.

Figure 4:
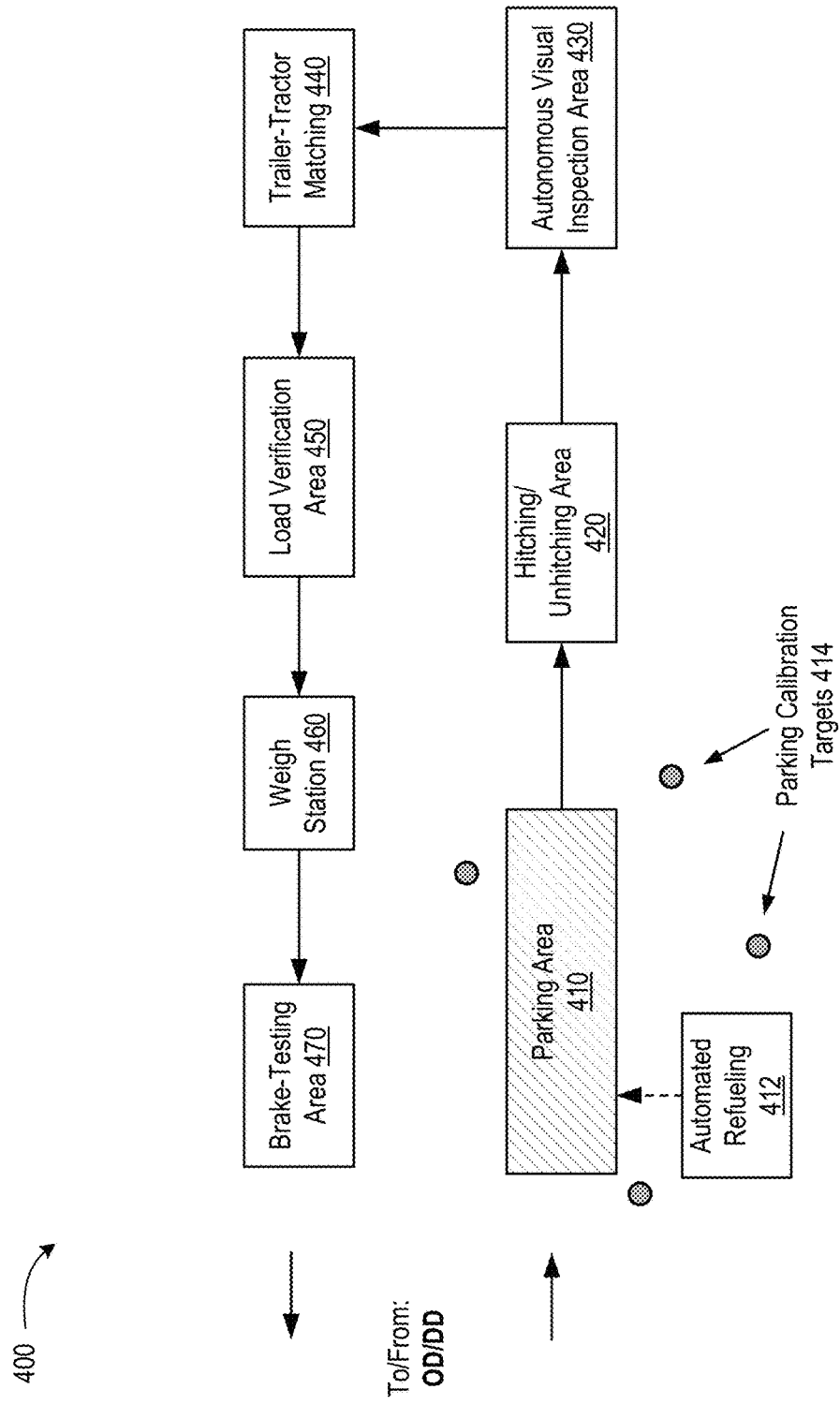
FIG. 4 is an example depiction of a transfer hub layout that supports various automated operations on autonomous vehicles, in accordance with some implementations of the present disclosure.

FIG. 4 is an example depiction of a transfer hub layout 400 that supports various automated operations on autonomous vehicles, in accordance with some implementations of the present disclosure. Depicted schematically (not to scale) are areas and facilities of the transfer hub where one or more operations can be performed on an autonomous vehicle arriving (or already present) at the hub. In various implementations, some areas and facilities are optional and some facilities can be combined with other facilities. The example layout 400 is non-limiting and various other facilities (not depicted explicitly) can be included. Arrows indicate a possible path through the depicted areas and facilities that an autonomous vehicle (e.g., an ADT) arriving at the hub can take, although some areas and facilities can be skipped or visited in a different order while some areas and facilities can be visited more than once before an autonomous vehicle (AV) leaves the hub.

In one example, a method to operate an AV in conjunction with the transfer hub illustrated in FIG. 4 (or a similar hub) may include: identifying a driving mission for the AV, the driving mission having a first portion and a second portion; responsive to the AV being on the first portion of the driving mission, disabling an autonomous driving mode of the AV; responsive to determining that the AV has arrived at a hub location, initializing the autonomous driving mode of the AV; and causing the AV to begin the second portion of the driving mission in the autonomous driving mode.

In another example, a method to perform autonomous delivery of a trailer load in conjunction with the transfer hub illustrated in FIG. 4 may include: identifying a delivery route for the trailer load, the delivery route having a starting location, a first hub, a second hub, and a final location; delivering, using a first AV operating in an AV driving mode, the trailer load from the starting location to the first hub; responsive to delivering the trailer load to the first hub, detaching the trailer load from the first AV; attaching the trailer load to a second AV; delivering, using the second AV operating in the AV driving mode, the trailer load from the first hub to the second hub; responsive to delivering the trailer load to the second hub, detaching the trailer load from the second AV; and delivering the trailer load from the second hub to the final location.

Referring further to the hub facilities depicted in FIG. 4, in a non-limiting example, an ADT can arrive at the hub and park at a parking area 410, e.g., waiting to be unloaded. While being parked at parking area 410, the ADT can undergo automated refueling 412 (e.g., via a refueling robot, as described in more details above). In one example, a method to refuel an AV tractor in conjunction with the transfer hub illustrated in FIG. 4 (or a similar hub) may include: identifying a parking location with the AV tractor to be refueled; dispatching a refueling robot to the identified parking location; and causing the refueling robot to perform a series of operation, such as (i) identifying a type of a refueling nozzle compatible with the AV tractor by reading a digital refueling identifier on the AV tractor, (ii) selecting the refueling nozzle of a plurality of refueling nozzles of the refueling robot; and (iii) using the selected refueling nozzle to deliver fuel to a fuel tank of the AV tractor.

While at the parking area 410, the ADT can use parking calibration targets 414 to identify its location, store the state of its data processing system, and shut down the data processing system in anticipation of unloading. In one example, a method to operate an AV at the parking area 410 of the transfer hub illustrated in FIG. 4 (or a similar hub) may include: stopping the AV, which operates in an autonomous driving mode, at a parking location: obtaining one or more first images of an outside environment; storing the one or more obtained first images in a memory of the AV; storing a state of the data processing system of the AV; shutting down the data processing system of the AV; starting up the data processing system of the AV; obtaining one or more second images of the outside environment; retrieving the one or more stored first images; determining, based on a comparison the one or more second images with the one or more first images that the AV has not moved since the first images were obtained; and responsive to determining that the AV has not moved since the first images were obtained, using the stored state of the data processing system of the AV to complete the starting up of the data processing system of the AV. In one variation of the method to operate the AV at the parking area 410, each of the one or more first images of the outside environment can include depictions of one or more calibration signs (parking calibration targets 414) that remain stationary relative to a non-moving vehicle.

After determining that the ADT has not been moved, starting up of the data processing system of the AV, and restoring the pre-shutdown state of the data processing system, the ADT can continue its progression through the transfer hub. For example, when the ADT is ready to be unloaded, the ADT can be moved (e.g., driven in an autonomous driving mode) to hitching/unhitching area 420 where the trailer delivered by the ADT can be unhitched, e.g., by a hitching robot (as described in more detail above). Additionally, the ADT can be provided with a new trailer for the ADT's next driving mission. In some implementations, the ADT can drive to the parking area 410 after unloading and return to the hitching/unhitching area 420 at a later time, when the new load (trailer) is ready for pick-up (hitching).

In one example, a method to form a trailer-tractor combination in conjunction with the transfer hub illustrated in FIG. 4 (or a similar hub) may include: identifying a parking area with a trailer load; causing an AV tractor operating in an AV driving mode to stop at a predefined location within the parking area; and responsive to the AV tractor stopping at the predefined location, dispatching a hitching robot to the trailer load, wherein the hitching robot is to (i) make the trailer load to approach the AV tractor and (ii) engage a hitching mechanism to attach the trailer load to the AV tractor. In one variation, the method to form the trailer-tractor combination can include obtaining one or more images of the formed tractor-trailer combination; and identifying, by a processing device, and based on the one or more obtained images, an indication that the tractor-trailer combination has been formed correctly or incorrectly.

In particular, after the ADT is hitched to the new trailer, the ADT can proceed (e.g., be driven by its autonomous driving system) to an autonomous visual inspection area 430, where imaging technology can be used to identify if hitching has been properly performed, including proper use of the fifth wheel, kingpin, etc., and proper attachment of all lines and tractor-trailer communications. If any improper connections or other problems have been identified, the ADT can drive (or be moved) back to the hitching/unhitching area 420. If no improper connections or other problems have been identified, the ADT can proceed to a trailer-tractor matching area 440 to validate (e.g., using barcodes or any other digital identifiers) that the correct trailer has been attached to the ADT.

Additionally, the ADT can move to a load verification area 450 to screen the trailer for illegal, unsafe, or unauthorized content. Load verification can be performed using a variety of remote-detection techniques, including but not limited to X-ray screening, chemical sensor screening, ultrasonic screening, metal-detection screening, and the like. The ADT can also take the trailer-load to the weigh station 460 where the load distribution can be assessed. As described above, the ADT can drive (or be driven) onto a platform that can weigh each axle of the tractor-trailer combination and/or weigh each wheel (or a set of closely positioned wheels, e.g., all four wheels mounted on two closely-positioned axes in the left rear of the trailer) to determine the total weight of the load and the location of the center of mass of the load. For example, the center-of-mass coordinates of the load can be determined from a combination of (i) the weight measurements performed on the tractor-trailer combination at the weigh station 460 and (ii) the weight distribution of the tractor, which can be known independently (e.g., from the tractor technical specification or from earlier measurements performed at the weigh station 460 on the tractor alone). In some implementations, dynamic (e.g., shaking) platforms can be used to determine a dynamic (e.g., acceleration, angular acceleration, etc.) response of the tractor-trailer combination to identify vertical coordinates (e.g., heights) of the center-of-mass of the trailer load and the tractor.

The ADT can also be driven to a brake-testing area 470 to check the function of the brakes of the trailer and tractor prior to the vehicle departing on a driving mission. In various implementations, brake-testing area 470 can include leveled, uphill, or downhill sections, platforms for testing using dyno robots, and the like. In some implementations, testing of the trailer brakes can be performed separately from testing brakes of the tractor, e.g. by hitching the loaded trailer to a dyno robot that simulates forces experienced by the trailer during motion along uphill, downhill, or curved road sections.

In one example, the transfer hub illustrated in FIG. 4 can enable a method to perform an inspection prior to an AV driving mission, including: attaching a trailer load to an AV tractor to form a trailer-tractor combination; taking the trailer-tractor combination operating in an AV driving mode to a weighing platform; responsive to the trailer-tractor combination being positioned on the weighing platform, obtaining a plurality of weight measurements, each of the weight measurements associated with a respective wheel of a plurality of wheels of the trailer-tractor combination; and based at least in part on the plurality of weight measurements, determining a weight distribution of a load inside the trailer. A first variation of the method to perform the inspection can include determining horizontal coordinates associated with the weight distribution of the load inside the trailer.

In a second variation of the method to perform the inspection, the weighing platform is a dynamic platform and at least some of the plurality of weight measurements are obtained while the trailer-tractor combination undergoes vertical shaking. The vertical shaking can be used to determine one or more vertical coordinates associated with the weight distribution of the load inside the trailer, such as a height of the center of mass of the load, trailer, trailer-load combination, trailer-tractor combination, and the like. Additionally, prior to the tractor-trailer combination undergoing vertical shaking, suspension settings of at least a part of the tractor-trailer combination can be adjusted.

A third variation of the method to perform the inspection can include taking the trailer-tractor combination operating in the AV driving mode, to a trailer verification station; responsive to the trailer-tractor combination arriving at the trailer verification station, scanning a digital identifier of the trailer; and determining, based on matching of the scanned digital identifier of the trailer with a digital identifier of the AV tractor whether the trailer is correctly paired with the AV tractor.

A fourth variation of the method to perform the inspection can include: taking the trailer-tractor combination operating in the AV driving mode, to a brake-testing area; and causing the trailer-tractor combination to perform one or more acceleration-braking sequences to test brakes of the trailer.

FIGS. 5-9 depict flow diagrams illustrating methods 500-900 of autonomous trucking hub operations during various stages of a driving mission, including pre-mission preparation, actual roadway performance, and post-mission handling, in accordance with some implementations of the present disclosure. Methods 500-900 described below, and/or each of their individual functions, routines, subroutines, or operations can be performed by a processing device, having one or more processing units (CPU) and memory devices communicatively coupled to the CPU(s). In some implementations, methods 500-900 can be performed by multiple processing devices. For example, the processing device(s) of a dispatch server can identify the driving mission (e.g., select a load, destination, route, etc.) and generate instructions for the ADT. Processing device(s) of the ADT can process (e.g., using one or more codes or software modules of HOCM 131 of FIG. 1A) information collected by a sensing system of the ADT (e.g., sensing system 120 of FIG. 1A) and navigate the ADT operating in an autonomous driving mode to one or more stations of a hub, such as a loading station (trailer hitching station), weight station, tractor-trailer verification/matching station, refueling stations, brake testing station, and the like. Each of the stations can have its own processing device(s) that can facilitate specific functions performed by the respective station. More specifically, while the processing device(s) of the ADT can cause the ADT to move to the weight stations, the processing device(s) of the weight station can cause the weight station to perform a series of measurements to determine a distribution of load in the trailer hitched to the ADT. In certain implementations, operations of each of methods 500-900 performed by a particular processing device can be performed using a single processing thread. Alternatively, each of methods 500-900 can be performed using two or more processing threads, each thread executing one or more individual functions, routines, subroutines, or operations of the method. In an illustrative example, the processing threads implementing each of methods 500-900 can be synchronized (e.g., using semaphores, critical sections, and/or other thread synchronization mechanisms). Alternatively, the processing threads implementing each of methods 500-900 can be executed asynchronously with respect to each other. Various operations of each of methods 500-900 can be performed in a different order compared with the order shown in FIGS. 5-9. Some operations of the methods can be performed concurrently with other operations. Some operations can be optional.

Figure 5:
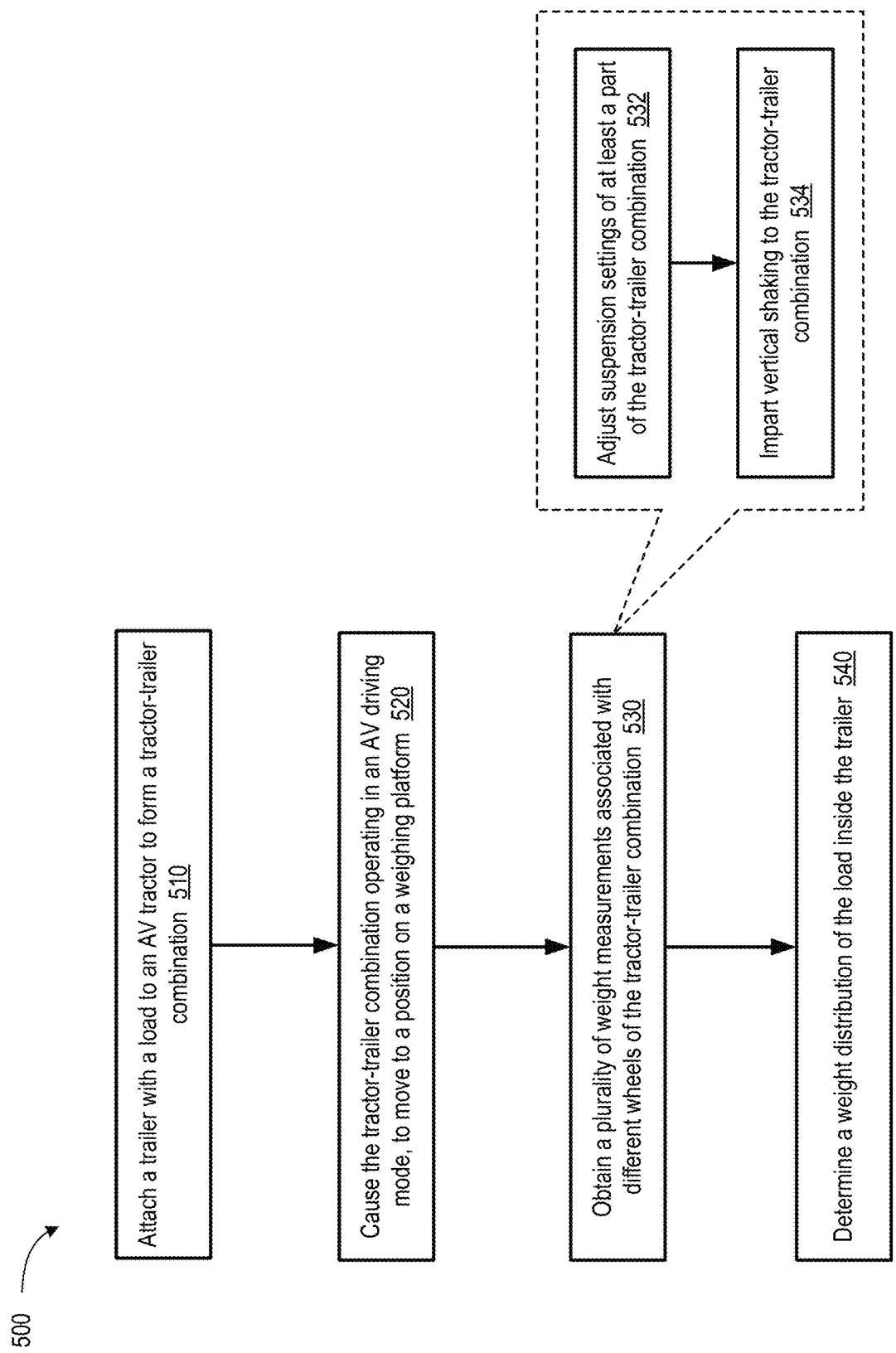
FIG. 5 depicts a flow diagram of an example method of commencing an autonomous driving mission, in accordance with some implementations of the present disclosure.

FIG. 5 depicts a flow diagram of an example method 500 of commencing an autonomous driving mission, in accordance with some implementations of the present disclosure. The ADT can be ADT 100 of FIG. 1A, or any other ADT referenced above in conjunction with FIG. 1B through FIG. 4, and the like. Method 500 can be used to determine weight and weight distribution of a load inside the trailer of the ADT. Method 500 can be performed prior to the actual driving mission (e.g., as part of a pre-mission check-up), at any point during the driving mission (e.g., an intermediate hub), or as part of a post-mission check-up. In some implementations, method 500 can be deployed to commence an autonomous driving mission. At block 510, the one or more processing devices performing method 500 can cause a trailer to be attached to an AV tractor to form a tractor-trailer combination. The trailer can include a load. At block 520, method 500 can continue with the one or more processing devices causing the tractor-trailer combination operating in an autonomous driving mode, to move to a position on a weighing platform.

Responsive to determining that the tractor-trailer combination is positioned on the weighing platform, the one or more processing devices performing method 500 can obtain, at block 530, a plurality of weight measurements. Each of the plurality of weight measurements can be associated with a respective wheel of a plurality of wheels of the tractor-trailer combination. For example, each wheel (or a set of all wheels mounted on a given side of the same axle) can be positioned on a separate scale capable of measuring the weight of the wheel (or the set of wheels). At block 540, method 500 can continue with the one or more processing devices determining, based at least in part on the plurality of weight measurements, a weight distribution of the load inside the trailer. In some implementations, as illustrated by the callout portion of FIG. 5, obtaining the plurality of weight measurements can include, at block 532, adjusting suspension settings of at least a part of the tractor-trailer, e.g. making the suspension stiffer, softer, lower, higher, or modifying it in any other suitable way. At block 534, vertical shaking can be imparted to the tractor-trailer combination, e.g., by applying unequal vertical forces to at least two different wheels (sets of wheels) of the tractor-trailer combination. As a result of such measurements, determining the weight distribution of the load can include determining horizontal coordinates of a center of mass of the load. In some implementations, determining the weight distribution of the load can include determining one or more vertical coordinates associated with the weight distribution of the load inside the trailer. For example, the vertical coordinates can be the height of the center of mass of the load, or the height of the center of mass of some portion of the load.

Figures 6A, 6B:
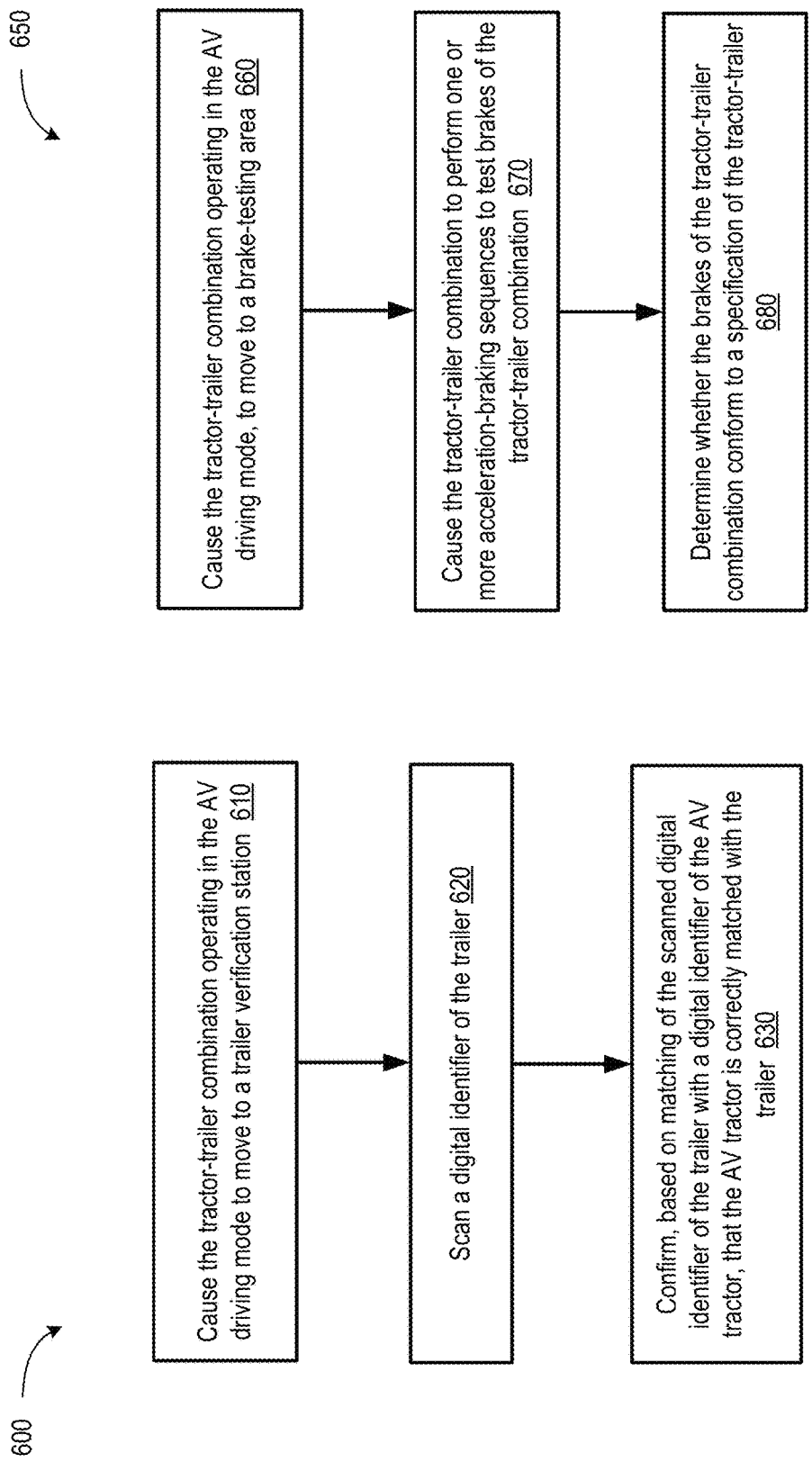
FIG. 6A depicts a flow diagram of an example method of verifying a correct tractor-to-load matching in autonomous trucking missions, in accordance with some implementations of the present disclosure.
FIG. 6B depicts a flow diagram of an example method of performing brake testing for autonomous trucking missions, in accordance with some implementations of the present disclosure.

FIG. 6A depicts a flow diagram of an example method 600 of verifying a correct tractor-to-load matching in autonomous trucking missions, in accordance with some implementations of the present disclosure. The ADT can be any ADT described in conjunction with FIG. 1A through FIG. 4. Method 600 can be used to determine whether the tractor has received a correct intended trailer for the driving mission. Method 600 can be performed prior to the actual driving mission and/or upon arrival at an intermediate transfer hub or a final destination. At block 610, the one or more processing devices performing method 600 can cause the tractor-trailer combination, operating in the autonomous driving mode, to move to a trailer verification station. The trailer verification station should be understood as any area where a scanner can read a digital identifier of the trailer, including while the tractor-trailer combination is in motion. Upon arrival of the tractor-trailer combination at the trailer verification station, the one or more processing devices performing method 600 can continue, at block 620, with scanning a digital identifier of the trailer. At block 630, the one or more processing devices can confirm, based on matching of the scanned digital identifier of the trailer with a digital identifier of the autonomously driven tractor, that the tractor is correctly matched with the trailer. In some instances, the one or more processing devices can determine that the digital identifier of the trailer does not match the digital identifier of the tractor and, in response, can halt the driving mission, e.g., by communicating an alarm signal to the dispatch server or a human supervisor. In some implementations, matching of the AV tractor to the trailer can be performed using the sensing system of the AV tractor, which can take place at any location within the hub prior to departure. More specifically, the AV tractor can use one or more sensors to take an image (or a number of images) of a digital identifier of the trailer. For example, the digital identifier of the trailer can be located on the front of the trailer within sight of a camera (including an infrared camera), a lidar, or any other suitable sensor. The processing device(s) of the AV tractor can then read the digital identifier and verify that the AV tractor is correctly matched with the trailer.

FIG. 6B depicts a flow diagram of an example method 650 of performing brake testing for autonomous trucking missions, in accordance with some implementations of the present disclosure. The ADT can be any ADT described in conjunction with FIG. 1A through FIG. 4. Method 650 can be used to determine whether the tractor-trailer combination has adequate braking capability given the weight of the load and the total weight of the tractor-trailer combination. The brakes being tested can include tractor brakes, trailer brakes (including parking brakes), or any combination thereof. More specifically, at block 660, method 650 can cause, by the one or more processing devices, the tractor-trailer combination operating in the autonomous driving mode, to move to a brake-testing area. At block 670, the processing device(s) performing method 650 can cause the tractor-trailer combination to perform one or more acceleration-braking sequences to test brakes of the tractor-trailer combination, wherein. At block 680, method 600 can continue with the one or more processing devices determining, based on a measurement (or multiple measurements) performed during the one or more acceleration-braking sequences, whether the brakes of the tractor-trailer combination conform to a proper specification. In some implementations, the specification can reflect existing regulations and/or technical requirements of the tractor and/or trailer manufacturer. In some implementations, acceleration-braking sequences can also (or instead) be used to estimate the mass of the tractor-trailer combination and, by inference, the mass of the load (e.g., based on the known weight of the AV tractor and the weight of the empty trailer). Method 600 can be performed prior to the driving mission and/or upon arrival at any intermediate point (e.g., another transfer hub) prior to the final destination.

FIG. 7A depicts a flow diagram of an example method 700 of automated hitching of a trailer to an ADT, in accordance with some implementations of the present disclosure. The ADT can be any ADT described in conjunction with FIG. 1A through FIG. 4. Method 700 can be performed, e.g., as part of block 510 of method 500. More specifically, at block 710, method 700 can include identifying, by the one or more processing devices, a parking area where the trailer is located. At block 720, method 700 can continue with the one or more processing devices causing the AV tractor, operating in the AV driving mode, to move to a predefined location within the parking area. The predefined location can be at a certain distance from the parked trailer. Responsive to the AV tractor arriving at the predefined location, the one or more processing devices can cause, at block 730, a hitching robot to be dispatched to the trailer. Subsequently, the hitching robot can move (e.g., push, pull, etc.) the trailer to the AV tractor and engage a hitching mechanism to attach the trailer to the AV tractor.

At block 740, method 700 may continue with obtaining one or more images of the tractor-trailer combination. At block 745, the one or more processing devices may identify, based on the one or more obtained images, that the tractor-trailer combination has been formed incorrectly. In some implementations, identifying that the tractor-trailer combination has been formed incorrectly can include processing the one or more images of the tractor-trailer combination using a neural network. The neural network can be trained using one or more training images of correctly formed tractor-trailer combinations and one or more training images of incorrectly formed tractor-trailer combinations. Method 700 or any parts of this method, e.g., blocks 710-745 or blocks 760-780, can be performed prior to the driving mission and/or upon arrival at any intermediate point (e.g., another transfer hub) prior to the final destination. For example, method 700 or any parts of this method can be performed to unhitch the trailer from one ADT and to hitch the trailer to another ADT at an intermediate transfer hub. In particular, when a tractor-trailer combination arrives at the destination hub or an intermediate hub and stops within a designated parking area, a hitching robot can be dispatched to the tractor-trailer combination and detach the AV tractor from the trailer. Operations of block 745 can then be repeated with taking one or more images of the AV tractor and the trailer. The images can then be processed, e.g., using a neural network, to confirm that the trailer has been detached and that the AV tractor is free to move.

FIG. 7B depicts a flow diagram of an example method 750 of automated refueling of an ADT, in accordance with some implementations of the present disclosure. The ADT can be any ADT described in conjunction with FIG. 1A through FIG. 4. Method 750 can include, at block 760, dispatching, using the one or more processing devices, a refueling robot to the AV tractor. At block 770, method 700 can continue with the one or more processing devices causing the refueling robot to identify a refueling nozzle compatible with the AV tractor by scanning a digital refueling identifier of the AV tractor. At block 780, method 700 can include using the identified nozzle to deliver a fuel to a fuel tank of the AV tractor. In other implementations, various other fluids can be delivered in the same way. For example, the identified nozzle can deliver a fluid that is a diesel fuel, a diesel exhaust fluid, a transmission fluid, a coolant, a cleaning (washing) fluid, an engine oil, a clutch fluid, a brake fluid, a differential fluid, a power steering fluid, and the like. Method 750 can be performed prior to the driving mission and/or upon arrival at any intermediate point (e.g., any intermediate transfer hub) prior to the final destination, or at the final destination.

Figure 8:
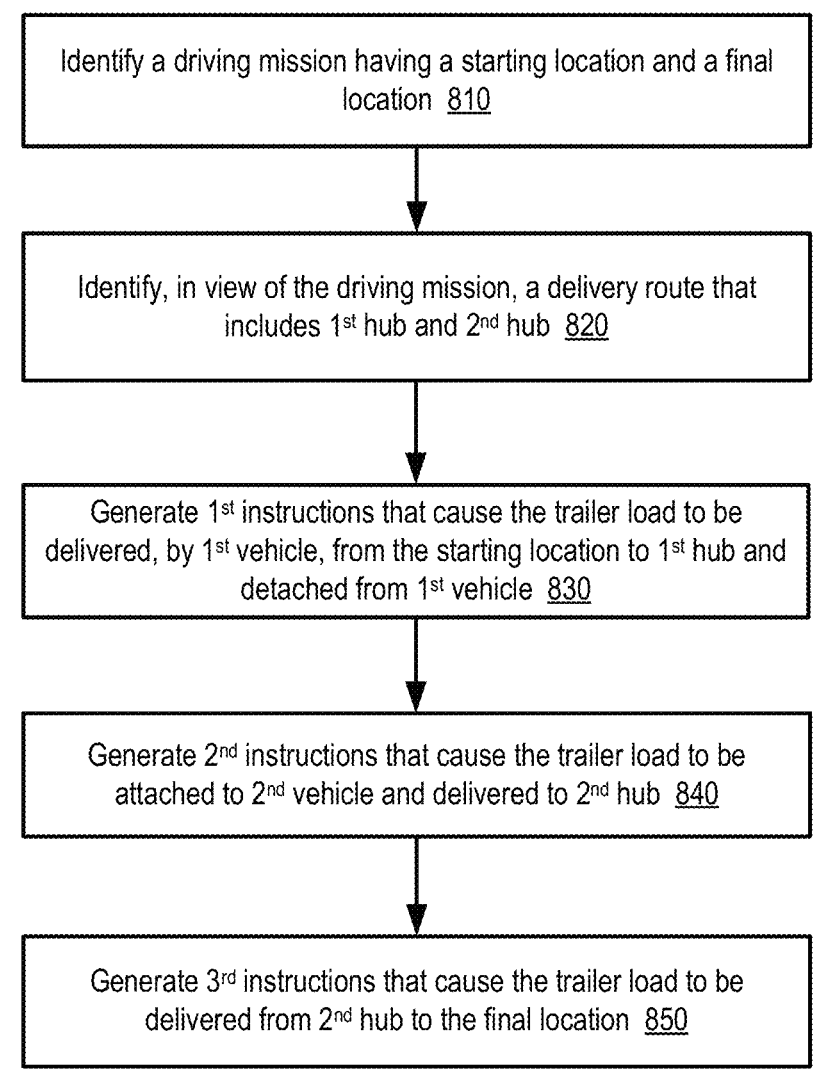
FIG. 8 depicts a flow diagram of an example method of performing an autonomous delivery of a trailer load, in accordance with some implementations of the present disclosure.

FIG. 8 depicts a flow diagram of an example method 800 of performing an autonomous delivery of a trailer load, in accordance with some implementations of the present disclosure. The ADT can be any ADT described in conjunction with FIG. 1A through FIG. 4. Method 800 can be performed by a processing device of a dispatch server, in some implementations. At block 810, the processing device performing method 800 can identify a driving mission that includes a starting location and a final location. At block 820, the processing device can identify, in view of the driving mission, a delivery route that includes a first hub and a second hub. At block 830, method 800 can continue with generating first instructions that cause the trailer load to be delivered, by a first vehicle, from the starting location to the first hub. After the trailer load is delivered to the first hub, the trailer load can be detached from the first vehicle. In some implementations, the first vehicle can be an autonomously operated vehicle. In some implementations, the first vehicle can be a driver-operated vehicle, e.g., a manual vehicle or an ADT operated in the manual mode.

At block 840, method 800 can continue with the processing device generating second instructions that cause the trailer load to be attached to a second vehicle and delivered, by the second vehicle, to the second hub. In some implementations, the second vehicle can be operating in an autonomous driving mode. In some implementations, the second vehicle can be a driver-operated vehicle, e.g., a manual vehicle or an ADT operated in the manual mode. At block 850, method 800 can include generating third instructions that cause the trailer load to be delivered from the second hub to the final location. The third instructions can be generated responsive to the second vehicle arriving at the second hub. In some implementations, the trailer is delivered from the second hub to the final location by a third vehicle that is different from the second vehicle. In some implementations, the third vehicle can be a driver-operated vehicle. In some implementations, the trailer can be delivered from the second hub to the final location by a third vehicle that is operating in an autonomous mode. In some implementations, the third vehicle can be the same as the second vehicle, and the trailer can be delivered from the second hub to the final location by the second vehicle using the driver-operated mode. For example, a driver can board the second vehicle at the second hub and drive the second vehicle from the second hub to the final destination. In some implementations, the third instructions can further cause the second vehicle to perform operations of method 900, which can include parking the second vehicle at the second hub.

Figure 9:
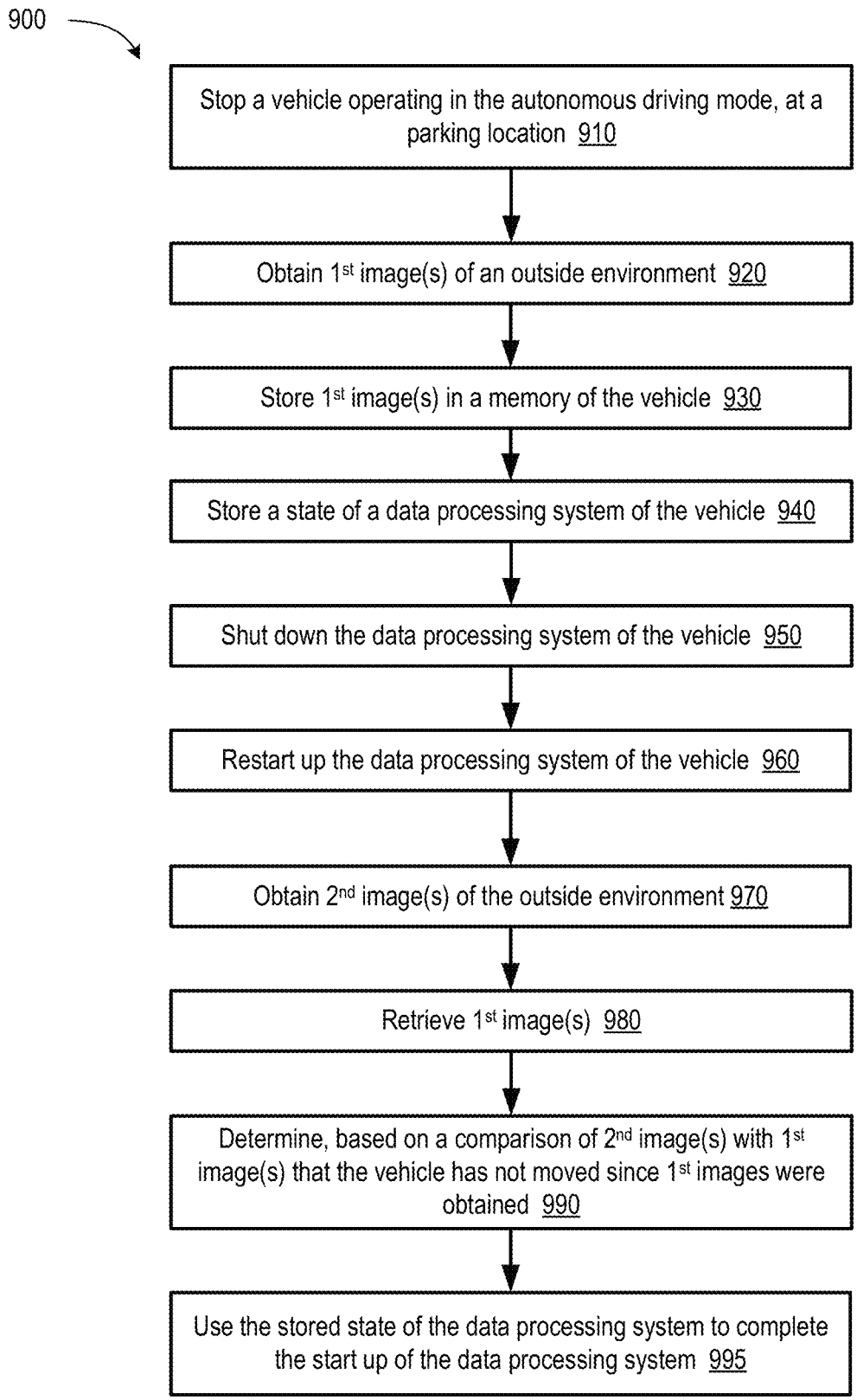
FIG. 9 depicts a flow diagram of an example method of parking an autonomous vehicle with subsequent resuming of autonomous driving operations, in accordance with some implementations of the present disclosure.

FIG. 9 depicts a flow diagram of an example method 900 of parking an autonomous vehicle with subsequent resuming of autonomous driving operations, in accordance with some implementations of the present disclosure. The ADT can be any ADT described in conjunction with FIG. 1A through FIG. 4. Method 900 can be performed by a processing device of the ADT. More specifically, at block 910, method 900 can include stopping a vehicle operating in the autonomous driving mode at a parking location within the second hub. At block 920, method 900 can continue with obtaining one or more first images of an outside environment. The first images (and the second images) can be obtained by any camera, infrared camera, radar sensor, lidar sensor, or any sensor capable of capturing any non-transient image capable of being stored. An image can be in any format and include any data that creates representation (e.g., a digital representation) of the appearance, geometry, or any other property of the environment. At block 930, method 900 can continue with storing the one or more first images in a memory of the vehicle. Additionally, at block 940, method 900 can include storing a state of a data processing system of the vehicle. At block 950, the processing device performing method 900 can shut down the data processing system of the vehicle.

At block 960, method 900 can continue with starting up the data processing system of the vehicle. The data processing system can be started after any period of the vehicle's inactivity. At block 970, method 900 can include obtaining one or more second images of the outside environment. At block 980, the processing device performing method 900 can retrieve the one or more stored first images and determine, based on a comparison of the one or more second images with the one or more first images that the second vehicle has not moved since the first images were obtained. At block 995, method 900 can continue with the processing device using the stored state of the data processing system of the second vehicle to complete the starting up of the data processing system of the vehicle. In some implementations, the one or more first images of the outside environment can include at least one depiction of a calibration sign of a hub. Similarly, the one or more second images of the outside environment can also include at least one depiction of the same calibration sign. The determination that the vehicle has not moved can be made by computing a motion vector of the calibration sign in the second image(s) relative to the first image(s) and determining that the motion vector is zero or below a certain threshold (e.g., below a noise threshold). Method 900, or any parts of this method, can be performed at any point along a driving mission, e.g., arrival at any intermediate point (e.g., transfer hub) or the final destination.

At least one implementation of the disclosure can be described in view of the following clauses. In clause 1, a method to commence an autonomous vehicle (AV) driving mission, the method comprising: causing, by one or more processing devices, a trailer to be attached to an AV tractor to form a tractor-trailer combination, the trailer comprising a load; causing, by the one or more processing devices, the tractor-trailer combination operating in an AV driving mode, to move to a position on a weighing platform: responsive to the tractor-trailer combination being positioned on the weighing platform, obtaining, by the one or more processing devices, a plurality of weight measurements, wherein each of the plurality of weight measurements is associated with a respective wheel of a plurality of wheels of the tractor-trailer combination; and determining, by the one or more processing devices and based at least in part on the plurality of weight measurements, a weight distribution of the load inside the trailer.

In clause 2, the method of clause 1, wherein determining the weight distribution of the load comprises determining horizontal coordinates of a center of mass of the load.

In clause 3, the method of clause 1, wherein obtaining the plurality of weight measurements comprises imparting vertical shaking to the tractor-trailer combination by applying unequal vertical forces to at least two different wheels of the plurality of wheels of the tractor-trailer combination, and wherein determining the weight distribution of the load comprises determining one or more vertical coordinates associated with the weight distribution of the load inside the trailer.

In clause 4, the method of clause 3, further comprising: adjusting suspension settings of at least a part of the tractor-trailer combination prior to imparting the vertical shaking to the tractor-trailer combination.

In clause 5, the method of clause 1, further comprising: causing, by the one or more processing devices, the tractor-trailer combination operating in the AV driving mode, to move to a trailer verification station; responsive to the tractor-trailer combination arriving at the trailer verification station, scanning a digital identifier of the trailer; and confirming, by the one or more processing devices and based on matching of the scanned digital identifier of the trailer with a digital identifier of the AV tractor, that the AV tractor is correctly matched with the trailer.

In clause 6, the method of clause 1, further comprising: obtaining, using one or more sensors of the AV tractor, an image of a digital identifier of the trailer; and confirming, by the one or more processing devices and based on the scanned digital identifier of the trailer, that the AV tractor is correctly matched with the trailer.

In clause 7, the method of clause 1, further comprising: causing, by the one or more processing devices, the tractor-trailer combination operating in the AV driving mode, to move to a brake-testing area; causing the tractor-trailer combination to perform one or more acceleration-braking sequences to test brakes of the tractor-trailer combination, wherein the brakes comprise at least some of tractor brakes or trailer brakes; and determining, by the one or more processing devices and based on a measurement performed during the one or more acceleration-braking sequences, whether the brakes of the tractor-trailer combination conform to a specification of the tractor-trailer combination.

In clause 8, the method of clause 1, wherein causing the trailer to be attached to the AV tractor comprising: identifying, by the one or more processing devices, a parking area with the trailer; causing, by the one or more processing devices, the AV tractor operating in the AV driving mode to move to a predefined location within the parking area; and responsive to the AV tractor arriving at the predefined location, causing, by the one or more processing devices, a hitching robot to be dispatched to the trailer, wherein the hitching robot is to (i) move the trailer to the AV tractor and (ii) engage a hitching mechanism to attach the trailer to the AV tractor.

In clause 9, the method of clause 1, further comprising; obtaining one or more images of the tractor-trailer combination; and identifying, by the one or more processing devices and based on the one or more obtained images, that the tractor-trailer combination has been formed incorrectly.

In clause 10, the method of clause 9, wherein identifying that the tractor-trailer combination has been formed incorrectly comprises processing the one or more images of the tractor-trailer combination using a neural network, wherein the neural network is trained using one or more training images of correctly formed tractor-trailer combinations and one or more training images of incorrectly formed tractor-trailer combinations.

In clause 11, the method of clause 1, further comprising: dispatching, by the one or more processing devices, a refueling robot to the AV tractor; and causing, by the one or more processing devices, the refueling robot to perform operations comprising: identifying a nozzle compatible with the AV tractor by scanning a digital identifier of the AV tractor; and using the identified nozzle to deliver a fluid to a tank of the AV tractor.

In clause 12, a system comprising: a memory; and one or more processing devices coupled to the memory; the one or more processing devices to: cause a trailer to be attached to an autonomous (AV) tractor to form a tractor-trailer combination, the trailer comprising a load; cause the tractor-trailer combination operating in an AV driving mode, to move to a position on a weighing platform: responsive to the tractor-trailer combination being positioned on the weighing platform, obtain a plurality of weight measurements, wherein each of the plurality of weight measurements is associated with a respective wheel of a plurality of wheels of the tractor-trailer combination; and determine, based at least in part on the plurality of weight measurements, a weight distribution of the load inside the trailer.

In clause 13, the system of clause 12, wherein to determine the weight distribution of the load, the one or more processing devices are to determine horizontal coordinates of a center of mass of the load.

In clause 14, the system of clause 12, wherein to obtain the plurality of weight measurements, the one or more processing devices are to cause a vertical shaking to be imparted to the tractor-trailer combination, wherein imparting the vertical shaking comprises applying unequal vertical forces to at least two different wheels of the plurality of wheels of the tractor-trailer combination, and wherein to determine the weight distribution of the load the one or more processing devices are to: determine one or more vertical coordinates associated with the weight distribution of the load inside the trailer.

In clause 15, the system of clause 12, wherein the one or more processing devices are further to: cause the tractor-trailer combination operating in the AV driving mode, to move to a trailer verification station; responsive to the tractor-trailer combination arriving at the trailer verification station, scan a digital identifier of the trailer; and confirm, based on matching of the scanned digital identifier of the trailer with a digital identifier of the AV tractor, that the AV tractor is correctly matched with the trailer.

In clause 16, the system of clause 12, wherein the one or more processing devices are further to: cause the tractor-trailer combination operating in the AV driving mode to move to a brake-testing area; cause the tractor-trailer combination to perform one or more acceleration-braking sequences to test brakes of the tractor-trailer combination, wherein the brakes comprise at least some of tractor brakes or trailer brakes; and determine, based on a measurement performed during the one or more acceleration-braking sequences, whether the brakes of the tractor-trailer combination conform to a specification of the tractor-trailer combination.

In clause 17, the system of clause 12, wherein to cause the trailer to be attached to the AV tractor the one or more processing devices are to: identify a parking area with the trailer; cause the AV tractor operating in the AV driving mode to move to a predefined location within the parking area, and responsive to the AV tractor arriving at the predefined location, cause a hitching robot to be dispatched to the trailer, wherein the hitching robot is to (i) move the trailer to the AV tractor and (ii) engage a hitching mechanism to attach the trailer to the AV tractor.

In clause 18, the system of clause 12, wherein the one or more processing devices are further to: dispatch a refueling robot to the AV tractor; and cause the refueling robot to perform operations comprising: identifying a refueling nozzle compatible with the AV tractor by scanning a digital refueling identifier of the AV tractor; and using the identified nozzle to deliver a fluid to a tank of the AV tractor.

In clause 19, a non-transitory computer-readable medium storing instructions thereon that when executed by one or more processing devices cause the one or more processing devices to: cause a trailer to be attached to an autonomous (AV) tractor to form a tractor-trailer combination, the trailer comprising a load; cause the tractor-trailer combination operating in an AV driving mode, to move to a position on a weighing platform; responsive to the tractor-trailer combination being positioned on the weighing platform, obtain a plurality of weight measurements, wherein each of the plurality of weight measurements is associated with a respective wheel of a plurality of wheels of the tractor-trailer combination; and determine, based at least in part on the plurality of weight measurements, a weight distribution of the load inside the trailer.

In clause 20, the non-transitory computer-readable medium of clause 19, wherein to determine the weight distribution of the load, the one or more processing devices are to determine horizontal coordinates of a center of mass of the load, and wherein to obtain the plurality of weight measurements, the one or more processing devices are to cause a vertical shaking to be imparted to the tractor-trailer combination, wherein imparting the vertical shaking comprises applying unequal vertical forces to at least two different wheels of the plurality of wheels of the tractor-trailer combination, and wherein to determine the weight distribution of the load the one or more processing devices are to: determine one or more vertical coordinates associated with the weight distribution of the load inside the trailer.

In clause 21, the non-transitory computer-readable medium of clause 18, wherein the instructions are further to cause the one or more processing devices to: cause the tractor-trailer combination operating in the AV driving mode, to move to a trailer verification station; responsive to the tractor-trailer combination arriving at the trailer verification station, scan a digital identifier of the trailer; and confirm, based on matching of the scanned digital identifier of the trailer with a digital identifier of the AV tractor, that the AV tractor is correctly matched with the trailer.

In clause 22, a method to perform autonomous delivery of a trailer load, the method comprising: identifying, by a processing device, a driving mission comprising a starting location and a final location, identifying, by the processing device and in view of the driving mission, a delivery route comprising a first hub and a second hub; generating first instructions that cause the trailer load to be delivered, by a first vehicle, from the starting location to the first hub and detached, from the first vehicle; generating second instructions that cause the trailer load to be attached to a second vehicle and delivered, by the second vehicle operating in an autonomous driving mode, to the second hub; and generating third instructions that cause the trailer load to be delivered from the second hub to the final location.

In clause 23, the method of clause 22, wherein the first vehicle is a driver-operated vehicle.

In clause 24, the method of clause 22, wherein the first vehicle is an autonomously operated vehicle.

In clause 25, the method of clause 22, wherein the second vehicle is an autonomously operated vehicle.

In clause 26, the method of clause 22, wherein the trailer is delivered from the second hub to the final location by a third vehicle, wherein the third vehicle is a driver-operated vehicle.

In clause 27, the method of clause 22, wherein the trailer is delivered from the second hub to the final location by a third vehicle operating an autonomous mode.

In clause 28, the method of clause 22, wherein the trailer is delivered from the second hub to the final location by the second vehicle in a driver-operated mode.

In clause 29, the method of clause 22, wherein the third instructions are generated responsive to the second vehicle arriving at the second hub.

In clause 30, the method of clause 22, wherein the third instructions further comprise causing the second vehicle to perform operations comprising: stopping the second vehicle operating in the autonomous driving mode, at a parking location within the second hub; obtaining one or more first images of an outside environment; storing the one or more first images in a memory of the second vehicle; storing a state of a data processing system of the second vehicle; and shutting down the data processing system of the second vehicle.

In clause 31, the method of clause 30, wherein the operations further comprise: starting up the data processing system of the second vehicle; obtaining one or more second images of the outside environment; retrieving the one or more first images; determining, based on a comparison the one or more second images with the one or more first images that the second vehicle has not moved since the first images were obtained: and using the stored state of the data processing system of the second vehicle to complete the starting up of the data processing system of the second vehicle.

In clause 32, the method of clause 31, wherein the operations further comprise: delivering, by the second vehicle operating in the autonomous mode, the trailer load from the second hub to the final location.

In clause 33, the method of clause 30, wherein the one or more first images of the outside environment comprise at least one depiction of a calibration sign of the second hub.

Figure 10:
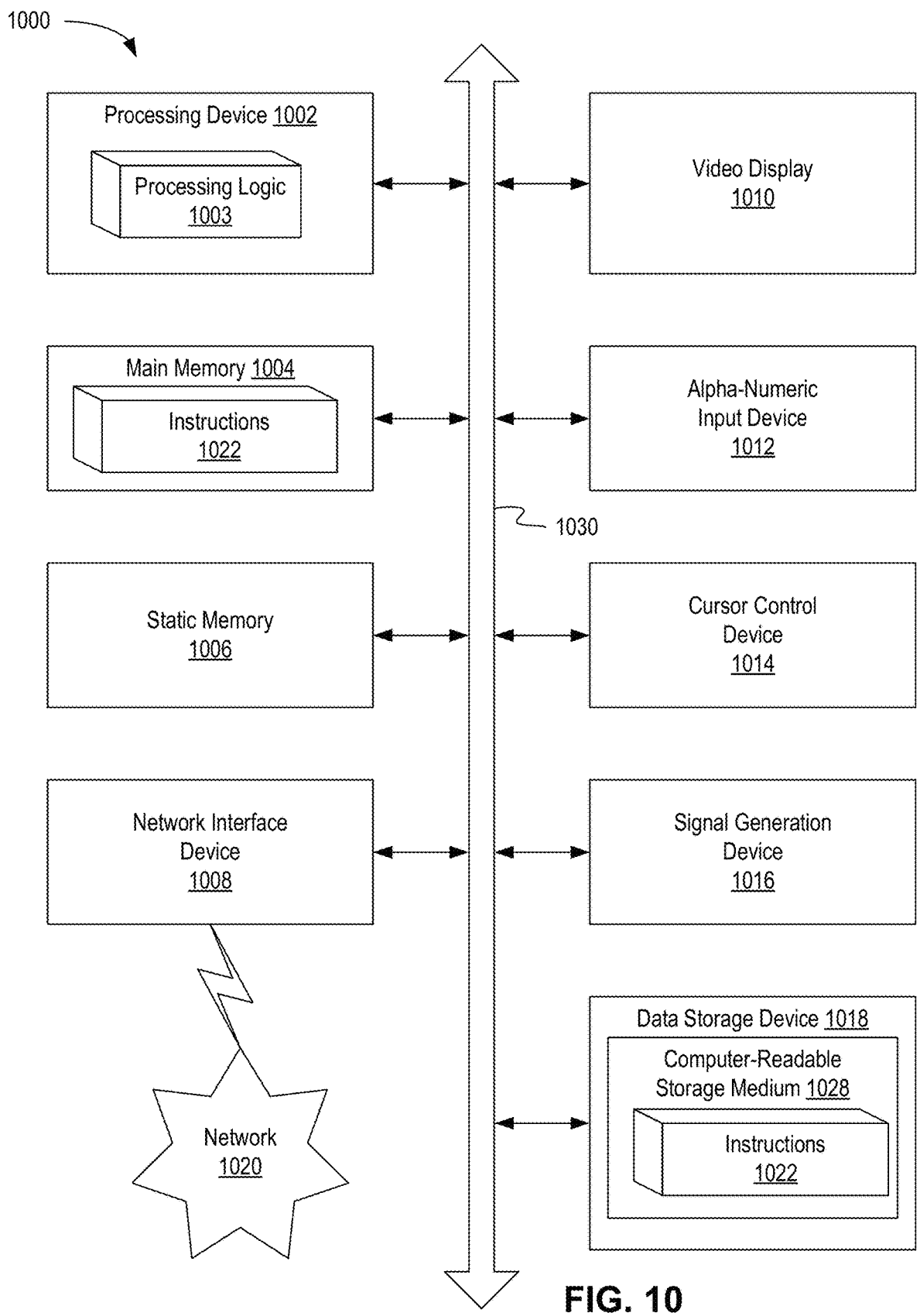
FIG. 10 depicts a block diagram of an example computer device capable of performing operations in accordance with some implementations of the present disclosure.

FIG. 10 depicts a block diagram of an example computer device 1000 capable of performing operations in accordance with some implementations of the present disclosure. Example computer device 1000 can be connected to other computer devices in a LAN, an intranet, an extranet, and/or the Internet. Computer device 1000 can execute operations of the sensing system 120, data processing system 130, AVCS 140, or any combination thereof. Computer device 1000 can execute operations of a dispatch/control center, transfer hub, weight station, refueling station, trailer matching station, and the like. Computer device 1000 can operate in the capacity of a server in a client-server network environment. Computer device 1000 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 1000 can include a processing device 1002 (also referred to as a processor or CPU), which can include processing logic 1003, a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which can communicate with each other via a bus 1030.

Processing device 1002 represents one or more general-purpose processing devices such as a microprocessor, central processing unit, or the like. More particularly, processing device 1002 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 can be configured to execute instructions performing method 500 of commencing an autonomous driving mission, method 600 of verifying a correct tractor-to-load matching in autonomous trucking missions, method 650 of performing brake testing for autonomous trucking missions, method 700 of automated hitching of a trailer to an ADT, method 750 of automated refueling of an ADT, method 800 of performing an autonomous delivery of a trailer load, and method 900 of parking an autonomous vehicle with subsequent resuming of autonomous driving operations.

Example computer device 1000 can further comprise a network interface device 1008, which can be communicatively coupled to a network 1020. Example computer device 1000 can further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 can include a computer-readable storage medium (or, more specifically, a non-transitory computer-readable storage medium) 1028 on which is stored one or more sets of executable instructions 1022. In accordance with one or more aspects of the present disclosure, executable instructions 1022 can comprise executable instructions performing method 500 of commencing an autonomous driving mission, method 600 of verifying a correct tractor-to-load matching in autonomous trucking missions, method 650 of performing brake testing for autonomous trucking missions, method 700 of automated hitching of a trailer to an ADT, method 750 of automated refueling of an ADT, method 800 of performing an autonomous delivery of a trailer load, and method 900 of parking an autonomous vehicle with subsequent resuming of autonomous driving operations.

Executable instructions 1022 can also reside, completely or at least partially, within main memory 1004 and/or within processing device 1002 during execution thereof by example computer device 1000, main memory 1004 and processing device 1002 also constituting computer-readable storage media. Executable instructions 1022 can further be transmitted or received over a network via network interface device 1008.

While the computer-readable storage medium 1028 is shown in FIG. 10 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method to commence an autonomous vehicle (AV) driving mission, the method comprising:
    causing, by one or more processing devices, a trailer to be attached to an AV tractor to form a tractor-trailer combination, the trailer comprising a load;
    causing, by the one or more processing devices, the tractor-trailer combination operating in an AV driving mode, to move to a position on a weighing platform;
    responsive to the tractor-trailer combination being positioned on the weighing platform, obtaining, by the one or more processing devices, a plurality of weight measurements, wherein obtaining the plurality of weight measurements comprises applying, using the weighing platform, unequal vertical forces to at least two different wheels of a plurality of wheels of the tractor-trailer combination; and
    determining, by the one or more processing devices and based at least in part on a response of the tractor-trailer combination to the applied vertical forces, one or more vertical coordinates associated with a weight distribution of the load inside the trailer.

2. The method of claim 1, wherein determining the weight distribution of the load comprises determining horizontal coordinates of a center of mass of the load.

3. The method of claim 1, further comprising:
    adjusting suspension settings of at least a part of the tractor-trailer combination prior to applying the vertical forces.

4. The method of claim 1, further comprising:
    causing, by the one or more processing devices, the tractor-trailer combination operating in the AV driving mode, to move to a trailer verification station;
    responsive to the tractor-trailer combination arriving at the trailer verification station, scanning a digital identifier of the trailer; and
    confirming, by the one or more processing devices and based on matching of the scanned digital identifier of the trailer with a digital identifier of the AV tractor, that the AV tractor is correctly matched with the trailer.

5. The method of claim 1, further comprising:
    obtaining, using one or more sensors of the AV tractor, an image of a digital identifier of the trailer; and
    confirming, by the one or more processing devices and based on the image of the digital identifier of the trailer, that the AV tractor is correctly matched with the trailer.

6. The method of claim 1, further comprising:
    causing, by the one or more processing devices, the tractor-trailer combination operating in the AV driving mode, to move to a brake-testing area; and
    causing the tractor-trailer combination to perform one or more acceleration-braking sequences to test brakes of the tractor-trailer combination, wherein the brakes comprise at least some of tractor brakes or trailer brakes.

7. The method of claim 1, wherein causing the trailer to be attached to the AV tractor comprising:
  identifying, by the one or more processing devices, a parking area with the trailer; causing, by the one or more processing devices, the AV tractor operating in the AV driving mode to move to a predefined location within the parking area; and
  responsive to the AV tractor arriving at the predefined location, causing, by the one or more processing devices, a hitching robot to be dispatched to the trailer, wherein the hitching robot is to (i) move the trailer to the AV tractor and (ii) engage a hitching mechanism to attach the trailer to the AV tractor.

8. The method of claim 1, further comprising:
  obtaining one or more images of the tractor-trailer combination; and
  identifying, by the one or more processing devices and based on the one or more obtained images, that the tractor-trailer combination has been formed incorrectly.

9. The method of claim 8, wherein identifying that the tractor-trailer combination has been formed incorrectly comprises processing the one or more images of the tractor-trailer combination using a neural network, wherein the neural network is trained using one or more training images of correctly formed tractor-trailer combinations and one or more training images of incorrectly formed tractor-trailer combinations.

10. The method of claim 1, further comprising:
  dispatching, by the one or more processing devices, a refueling robot to the AV tractor; and
  causing, by the one or more processing devices, the refueling robot to perform operations comprising:
    identifying a nozzle compatible with the AV tractor by scanning a digital identifier of the AV tractor; and
    using the identified nozzle to deliver a fluid to a tank of the AV tractor.

11. A system comprising: a memory; and
  one or more processing devices coupled to the memory; the one or more processing devices to:
    cause a trailer to be attached to an autonomous (AV) tractor to form a tractor-trailer combination, the trailer comprising a load;
    cause the tractor-trailer combination operating in an AV driving mode, to move to a position on a weighing platform;
    responsive to the tractor-trailer combination being positioned on the weighing platform, obtain a plurality of weight measurements, wherein to obtain the plurality of weight measurements, the one or more processing devices are to cause unequal vertical forces to be applied, using the weighing platform, to at least two different wheels of a plurality of wheels of the tractor-trailer combination; and
    determine, based at least in part on a response of the tractor-trailer combination to the applied vertical forces, one or more vertical coordinates associated with a weight distribution of the load inside the trailer.

12. The system of claim 11, wherein to determine the weight distribution of the load, the one or more processing devices are to determine horizontal coordinates of a center of mass of the load.

13. The system of claim 11, wherein the one or more processing devices are further to:
  cause the tractor-trailer combination operating in the AV driving mode, to move to a trailer verification station;
  responsive to the tractor-trailer combination arriving at the trailer verification station, scan a digital identifier of the trailer; and
  confirm, based on matching of the scanned digital identifier of the trailer with a digital identifier of the AV tractor, that the AV tractor is correctly matched with the trailer.

14. The system of claim 11, wherein the one or more processing devices are further to:
  cause the tractor-trailer combination operating in the AV driving mode to move to a brake-testing area; and
  cause the tractor-trailer combination to perform one or more acceleration-braking sequences to test brakes of the tractor-trailer combination, wherein the brakes comprise at least some of tractor brakes or trailer brakes.

15. The system of claim 11, wherein to cause the trailer to be attached to the AV tractor the one or more processing devices are to:
  identify a parking area with the trailer;
  cause the AV tractor operating in the AV driving mode to move to a predefined location within the parking area; and
  responsive to the AV tractor arriving at the predefined location, cause a hitching robot to be dispatched to the trailer, wherein the hitching robot is to (i) move the trailer to the AV tractor and (ii) engage a hitching mechanism to attach the trailer to the AV tractor.

16. The system of claim 11, wherein the one or more processing devices are further to: dispatch a refueling robot to the AV tractor; and
  cause the refueling robot to perform operations comprising:
    identifying a refueling nozzle compatible with the AV tractor by scanning
    a digital refueling identifier of the AV tractor; and
      using the identified nozzle to deliver a fluid to a tank of the AV tractor.

17. A non-transitory computer-readable medium storing instructions thereon that when executed by one or more processing devices cause the one or more processing devices to:
  cause a trailer to be attached to an autonomous (AV) tractor to form a tractor-trailer combination, the trailer comprising a load;
  cause the tractor-trailer combination operating in an AV driving mode, to move to a position on a weighing platform;
  responsive to the tractor-trailer combination being positioned on the weighing platform, obtain a plurality of weight measurements, wherein to obtain the plurality of weight measurements, the one or more processing devices are to cause unequal vertical forces to be applied, using the weighing platform, to at least two different wheels of a plurality of wheels of the tractor-trailer combination; and
  determine, based at least in part on a response of the tractor-trailer combination to the applied vertical forces, one or more vertical coordinates associated with a weight distribution of the load inside the trailer.

18. The non-transitory computer-readable medium of claim 17, wherein the instructions are further to cause the one or more processing devices to:
  cause the tractor-trailer combination operating in the AV driving mode, to move to a trailer verification station;

responsive to the tractor-trailer combination arriving at the trailer verification station, scan a digital identifier of the trailer; and confirm, based on matching of the scanned digital identifier of the trailer with a digital identifier of the AV tractor, that the AV tractor is correctly matched with the trailer.

* * * * *